United States Patent
Kim et al.

(10) Patent No.: US 10,034,275 B2
(45) Date of Patent: Jul. 24, 2018

(54) METHODS AND APPARATUSES FOR TRANSMITTING UPLINK IN WIRELESS ACCESS SYSTEM SUPPORTING MACHINE-TYPE COMMUNICATION

(71) Applicant: LG ELECTRONICS INC., Seoul (KR)

(72) Inventors: Bonghoe Kim, Seoul (KR); Dongyoun Seo, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 15/038,985

(22) PCT Filed: Dec. 3, 2014

(86) PCT No.: PCT/KR2014/011759
§ 371 (c)(1),
(2) Date: May 24, 2016

(87) PCT Pub. No.: WO2015/084048
PCT Pub. Date: Jun. 11, 2015

(65) Prior Publication Data
US 2016/0381674 A1 Dec. 29, 2016

Related U.S. Application Data

(60) Provisional application No. 61/911,458, filed on Dec. 3, 2013.

(51) Int. Cl.
*H04W 4/00* (2018.01)
*H04W 72/04* (2009.01)
(Continued)

(52) U.S. Cl.
CPC .......... *H04W 72/0413* (2013.01); *H04B 7/26* (2013.01); *H04L 1/189* (2013.01);
(Continued)

(58) Field of Classification Search
None
See application file for complete search history.

(56) References Cited

U.S. PATENT DOCUMENTS 9,439,158 B2 * 9/2016 Loehr ................ H04W 52/365
370/329
2009/0073922 A1 3/2009 Malladi et al.
(Continued)

FOREIGN PATENT DOCUMENTS

JP 2056513 A2 5/2009
JP 2010-538574 A 12/2010
(Continued)

OTHER PUBLICATIONS

LG Electronics, "PDSCH/PUSCH Transmission for MTC Coverage Enhancement," 3GPP TSG RAN WG1 Meeting #75, R1-135462, San Francisco, USA, Nov. 11-15, 2013, pp. 1-5.
(Continued)

*Primary Examiner* — Anh-Vu Ly
(74) *Attorney, Agent, or Firm* — Birch, Stewart, Kolasch & Birch, LLP

(57) ABSTRACT

The present invention relates to a wireless access system which supports machine-type communication (MTC), and more particularly, to various methods for efficiently transmitting, by an MTC terminal, uplink control information (UCI) and/or user data, and to apparatuses supporting same. A method for transmitting an uplink by an MTC terminal which supports machine-type communication (MTC) in a wireless access system, according to one embodiment of the present invention, may comprise the steps of: determining
(Continued)

whether an overlap exists between a plurality of physical uplink control channels (PUCCHs) for transmitting uplink control information (UCI) and a plurality of physical uplink shared channels (PUSCHs) for transmitting user data; multiplexing UCI in at least one subframe on an overlapping PUSCH when the plurality of PUCCHs and the plurality of PUSCHs overlap in the at least one subframe; and transmitting the PUSCH on which the UCI has been multiplexed in the at least one subframe.

12 Claims, 17 Drawing Sheets

(51) Int. Cl.
*H04B 7/26* (2006.01)
*H04L 1/18* (2006.01)
*H04L 5/00* (2006.01)
H04W 4/70 (2018.01)
H04W 88/02 (2009.01)

(52) U.S. Cl.
CPC .............. *H04L 1/1819* (2013.01); *H04L 5/00* (2013.01); *H04W 4/005* (2013.01); *H04W 4/70* (2018.02); *H04W 88/02* (2013.01)

(56) References Cited

U.S. PATENT DOCUMENTS

| | | | |
|---|---|---|---|
| 2013/0083753 A1 | 4/2013 | Lee et al. | |
| 2013/0114461 A1 | 5/2013 | Seo et al. | |
| 2013/0163543 A1* | 6/2013 | Freda | H04W 72/0406 370/329 |
| 2013/0195041 A1* | 8/2013 | Papasakellariou | H04W 72/042 370/329 |
| 2013/0195048 A1 | 8/2013 | Ekpenyong et al. | |
| 2013/0242824 A1* | 9/2013 | Lee | H04L 1/1819 370/281 |
| 2013/0250924 A1 | 9/2013 | Chen et al. | |
| 2013/0265970 A1 | 10/2013 | Papasakellariou et al. | |
| 2014/0098761 A1* | 4/2014 | Lee | H04W 74/006 370/329 |
| 2014/0105164 A1* | 4/2014 | Moulsley | H04W 72/042 370/329 |
| 2014/0254410 A1* | 9/2014 | Seo | H04L 1/1861 370/252 |
| 2015/0036618 A1* | 2/2015 | Xu | H04W 72/0413 370/329 |
| 2015/0036651 A1* | 2/2015 | Takeda | H04W 4/005 370/330 |
| 2015/0173024 A1* | 6/2015 | Seo | H04W 52/146 370/329 |
| 2015/0188684 A1* | 7/2015 | Takeda | H04W 72/04 370/329 |
| 2015/0280883 A1* | 10/2015 | Seo | H04L 5/0055 370/329 |
| 2015/0351092 A1* | 12/2015 | Seo | H04L 5/0046 370/329 |
| 2016/0143017 A1* | 5/2016 | Yang | H04W 4/005 370/329 |
| 2016/0165640 A1* | 6/2016 | Yang | H04W 4/005 370/336 |
| 2016/0262182 A1* | 9/2016 | Yang | H04W 72/04 370/329 |

FOREIGN PATENT DOCUMENTS

| | | |
|---|---|---|
| JP | 2011-223127 A | 11/2011 |
| JP | 2012-511291 A | 5/2012 |
| JP | 2012-524473 A | 10/2012 |
| JP | 2013-85151 A | 5/2013 |
| JP | 2013-102398 A | 5/2013 |
| WO | WO 2011/137408 A | 11/2011 |
| WO | WO 2012/011775 A2 | 1/2012 |
| WO | WO 2013/049768 A1 | 4/2013 |

OTHER PUBLICATIONS

New POSTCOM, "UL Coverage Improvement and Evaluation for Low Cost MTC," 3GPP TSG-RAN WG1 Meeting #72bis, R1-131120, Chicago, USA, Apr. 15-19, 2013, 4 pages.

QUALCOMM, "Text Proposal for Small Cells for Low Cost MTC Coverage Improvement," 3GPP TSG RAN WG1 Meeting #72bis, R1-131826, Chicago, USA, Apr. 15-19, 2013, 2 pages.

ZTE, "Discussion on Repetition for Control Channel and Traffic Channel," 3GPP TSG RAN WG1 Meeting #74, R1-133062, Barcelona, Spain, Aug. 19-23, 2013, 9 pages.

* cited by examiner

PUCCH format 1a and 1b structure (Normal CP case)

PUCCH format 1a and 1b structure (Extended CP case)

PUCCH format 2,2a and 2b structure (Normal CP case)

PUCCH format 2,2a and 2b structure (Extended CP case)

FIG. 10

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $\bar{n}_{OC}=0$ | $\bar{n}_{OC}=1$ | $\bar{n}_{OC}=2$ | $n_{OC}=0$ | $n_{OC}=1$ | $n_{OC}=2$ |
| $n_{CS}=1$ | $n_{CS}=0$ | n'=0 | | 12 | n'=0 | | 12 |
| 2 | 1 | | 6 | 13 | | 6 | 13 |
| 3 | 2 | 1 | | 14 | 1 | | 14 |
| 4 | 3 | | 7 | 15 | | 7 | 15 |
| 5 | 4 | 2 | | 16 | 2 | | 16 |
| 6 | 5 | | 8 | 17 | | 8 | 17 |
| 7 | 6 | 3 | | | 3 | | |
| 8 | 7 | | 9 | | | 9 | |
| 9 | 8 | 4 | | | 4 | | |
| 10 | 9 | | 10 | | | 10 | |
| 11 | 10 | 5 | | | 5 | | |
| 0 | 11 | | 11 | | | 11 | |

$\Delta_{shift}^{PUCCH} \in \{1,2,3\}$ for normal cyclic prefix
$\{1,2,3\}$ for extended cyclic prefix $\delta_{offset}^{PUCCH} \in \{0,1,...,\Delta_{shift}^{PUCCH}-1\}$ Cell specific cyclic shift offset Cell-specific Cyclic shift value of CAZAC sequence $n_{OC}$  Orthogonal sequence index for ACK/NACK
$\bar{n}_{OC}$  Orthogonal sequence index for RS
$n_{CS}$  Cyclic shift value of a CAZAC sequence
n'  ACK/NACK resource index used for the channelization in a RB FIG. 17
(a)
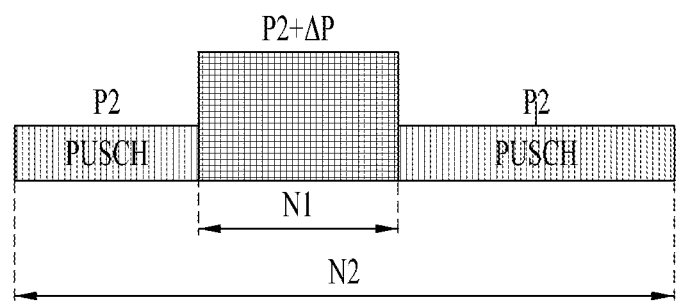
(b)
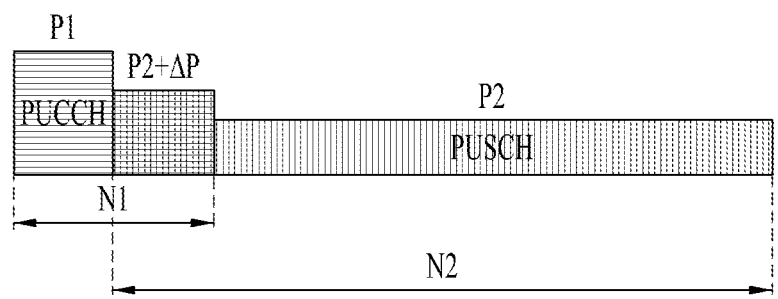
(c)
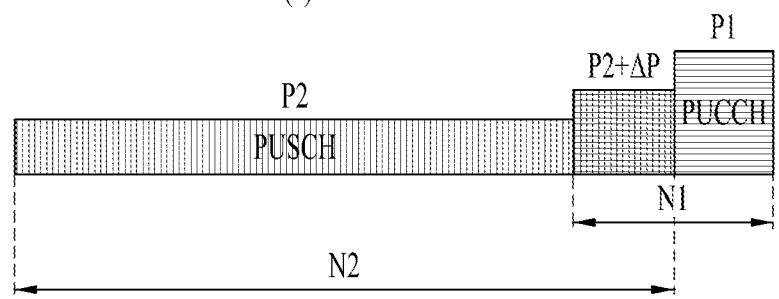
 PUCCH      PUSCH with HARQ-ACK      PUSCH

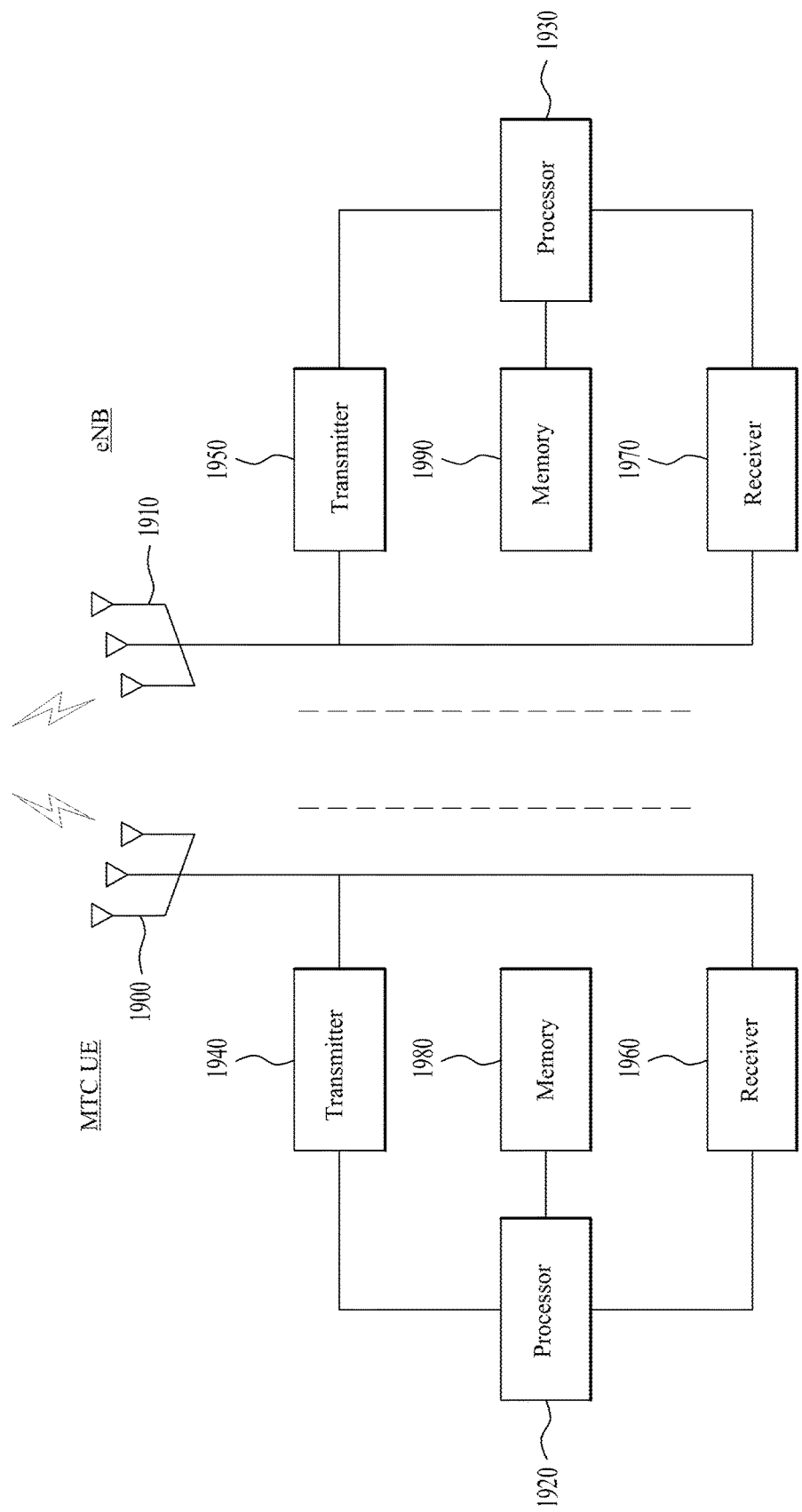

METHODS AND APPARATUSES FOR TRANSMITTING UPLINK IN WIRELESS ACCESS SYSTEM SUPPORTING MACHINE-TYPE COMMUNICATION

CROSS REFERENCE TO RELATED APPLICATIONS

This application is the National Phase of PCT International Application No. PCT/KR2014/011759, filed on Dec. 3, 2014, which claims priority under 35 U.S.C. 119(e) to U.S. Provisional Application No. 61/911,458, filed on Dec. 3, 2013, all of which are hereby expressly incorporated by reference into the present application.

TECHNICAL FIELD

The present invention relates generally to a wireless access system supporting Machine Type Communication (MTC), and more particularly, to various methods for efficiently transmitting Uplink Control Information (UCI) and/or user data by an MTC User Equipment (UE), and apparatuses supporting the methods.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method for transmitting Uplink Control Information (UCI) reliably and efficiently by a Machine Type Communication (MTC) User Equipment (UE).

Another object of the present invention is to provide methods for, in the case of periodic UCI transmission, transmitting UCI by multiplexing the UCI with repeatedly transmitted user data by an MTC UE.

Another object of the present invention is to provide methods for, in the case of aperiodic UCI transmission, transmitting UCI by multiplexing the UCI with repeatedly transmitted user data by an MTC UE.

Another object of the present invention is to provide a method for transmitting user data by an MTC UE, when the MTC UE transmits UCI.

Another object of the present invention is to provide apparatuses supporting the above methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a wireless access system supporting Machine Type Communication (MTC). More particularly, the present invention provides various methods for efficiently transmitting Uplink Control Information (UCI) and/or user data by an MTC User Equipment (UE), and apparatuses supporting the methods.

In an aspect of the present invention, provided herein is a method for performing uplink transmission by an MTC UE supporting MTC in a wireless access system, including determining whether a plurality of Physical Uplink Control Channels (PUCCHs) for carrying Uplink Control Information (UCI) are overlapped with a plurality of Physical Uplink Shared Channels (PUSCHs) for carrying user data, if the plurality of PUCCHs are overlapped with the plurality of PUSCHs in one or more subframes, multiplexing the UCI with overlapped PUSCHs in the one or more subframes, and transmitting the PUSCHs multiplexed with the UCI in the one or more subframes.

In another aspect of the present invention, an MTC UE for performing uplink transmission in a wireless access system includes a transmitter, and a processor for supporting MTC. The processor may be configured to determine whether a plurality of PUCCHs for carrying UCI are overlapped with a plurality of PUSCHs for carrying user data, to multiplex the UCI with overlapped PUSCHs in the one or more subframes, if the plurality of PUCCHs are overlapped with the plurality of PUSCHs in one or more subframes, and to transmit the PUSCHs multiplexed with the UCI in the one or more subframes.

In the above aspect of the present invention, the PUSCHs multiplexed with the UCI may be transmitted with increased transmission power, and the increased transmission power may be determined based on the number of the one or more subframes.

The increased transmission power may be determined based on the number of Resource Elements (REs) allocated to the UCI multiplexed in the one or more subframes and a total number of REs allocated for transmission of the plurality of PUSCHs.

Allocation positions of the UCI in the one or more subframes may be REs adjacent to reference signals allocated to the one or more subframes.

If the UCI is Hybrid Automatic Repeat reQuest (HARQ) information, the number of the REs is 4.

In the above aspect of the present invention, the plurality of PUCCHs may include the same control information and may be a predetermined number of repeated PUCCHs, and the plurality of PUSCHs may include the same user data and may be a predetermined number of repeated PUSCHs.

It is to be understood that both the foregoing general description and the following detailed description of the present invention are exemplary and explanatory and are intended to provide further explanation of the invention as claimed.

Advantageous Effects

As is apparent from the above description, the embodiments of the present invention have the following effects.

First, a Machine Type Communication (MTC) User Equipment (UE) can perform uplink transmission reliably and efficiently.

Secondly, when the MTC UE transmits UCI periodically, the MTC UE transmits the UCI by multiplexing the UCI with user data, while increasing transmission power or restricting the position of the piggybacked UCI. Therefore, the MTC UE can perform reliable uplink transmission.

Thirdly, since a method for transmitting UCI multiplexed with user data is provided even when the MTC UE repeatedly transmits the UCI aperiodically, the MTC UE can perform reliable uplink transmission.

It will be apparent to those skilled in the art that various modifications and variations can be made in the present invention without departing from the technical features or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention, illustrate embodiments of the invention and together with the description serve to explain the principle of the invention.

FIG. 10 illustrates ACKnowledgement/Negative ACKnowledgement (ACK/NACK) channelization for PUCCH formats 1a and 1 b.

FIG. 17 is a diagram illustrating increase/decrease of Physical Uplink Shared Channel (PUSCH) transmission power when a PUSCH is piggybacked with Hybrid Automatic Repeat request-ACK (HARQ-ACK) information.

FIG. 19 is a block diagram of apparatuses for implementing the methods illustrated in FIGS. 1 to 18.

BEST MODE

Figure 1:
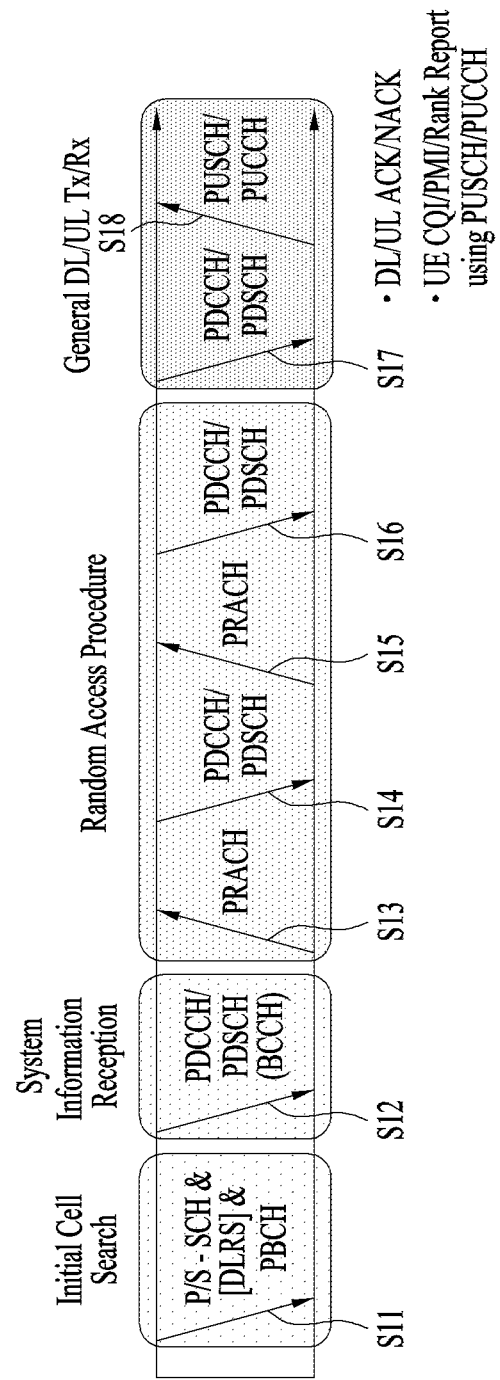
FIG. 1 is a conceptual diagram illustrating physical channels used in the embodiments and a signal transmission method using the physical channels.

Embodiments of the present invention described below in detail relate to a wireless access system supporting Machine Type Communication (MTC). More particularly, the embodiments of the present invention provide various methods for efficiently transmitting Uplink Control Information (UCI) and/or user data by an MTC User Equipment (UE), and apparatuses supporting the methods.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, a general UE refers to a device supporting communication service for a user in an LTE/LTE-A system, whereas an MTC UE refers to a device that operates in the LTE/LTE-A system and is equipped only with mandatory functions for supporting MTC, and a function for coverage extension. Further, the terms, multiplex and piggyback are interchangeably used with each other in similar meanings.

Hereinafter, 3GPP LTE/LTE-A systems which are examples of a wireless access system which can be applied to embodiments to the present invention will be explained.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
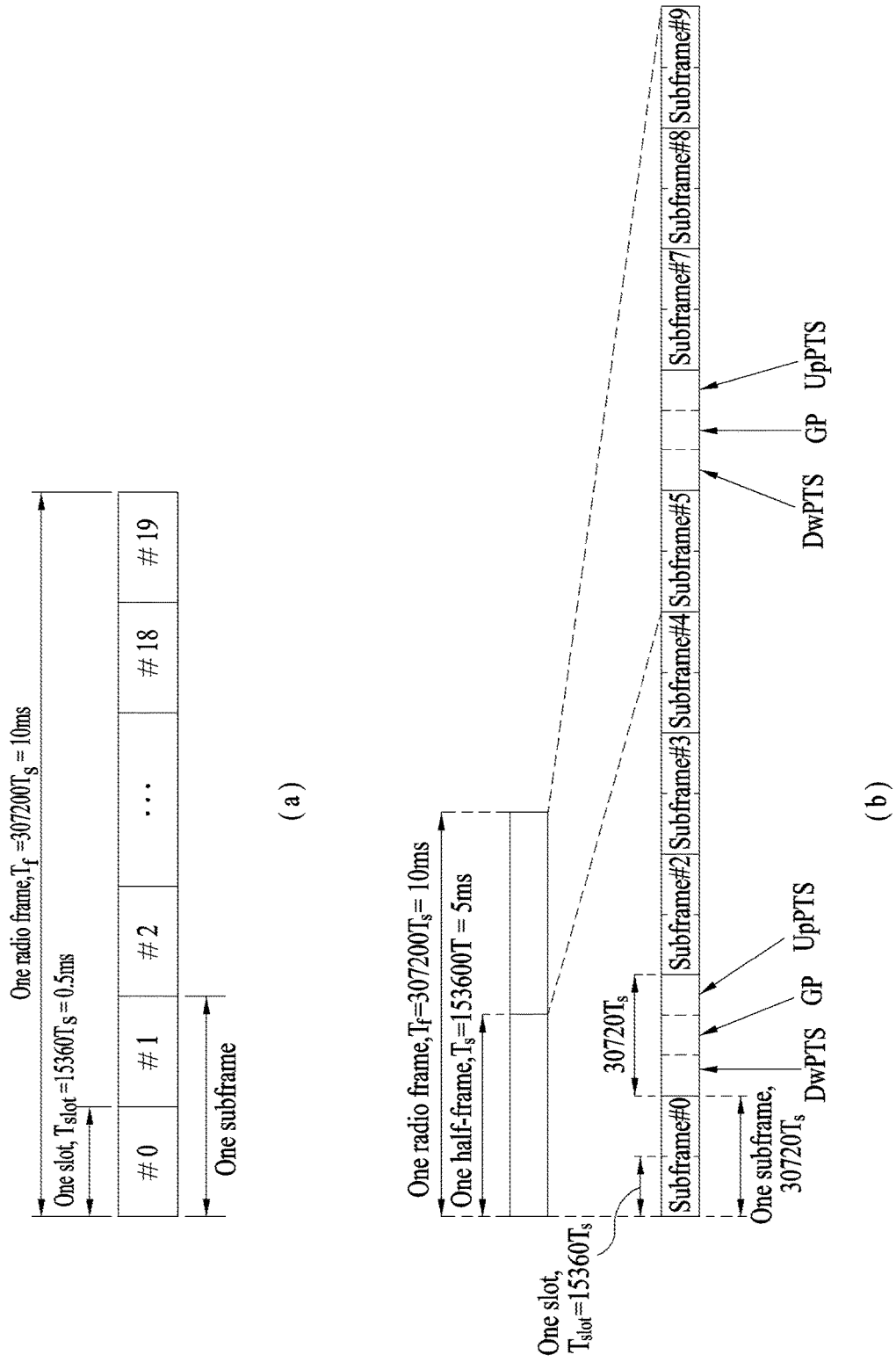
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 4:
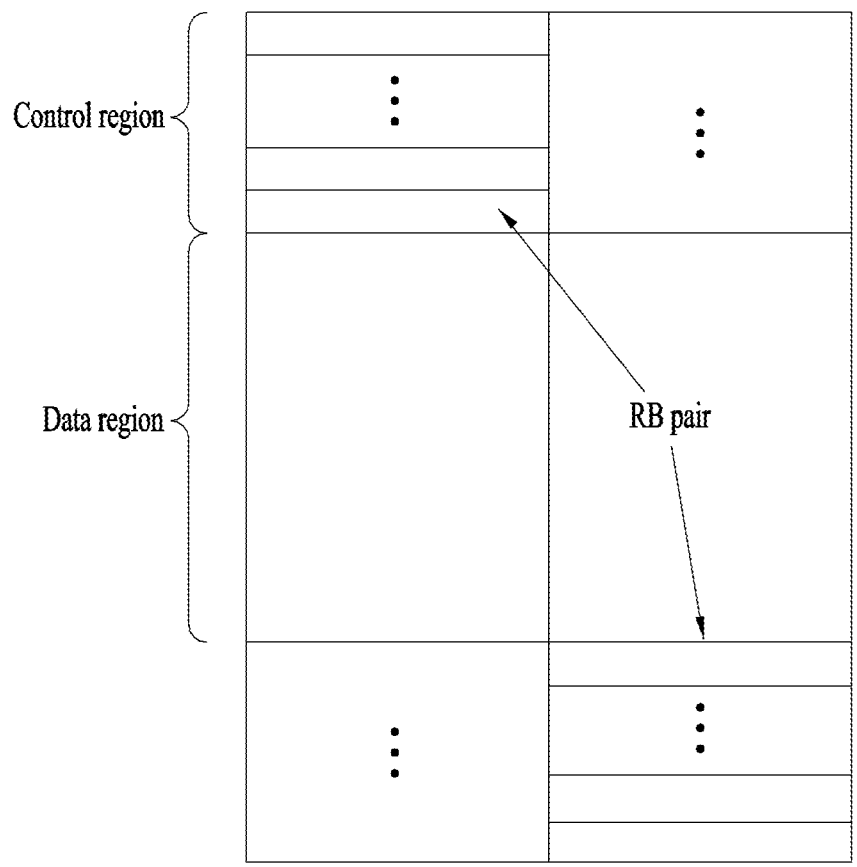
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
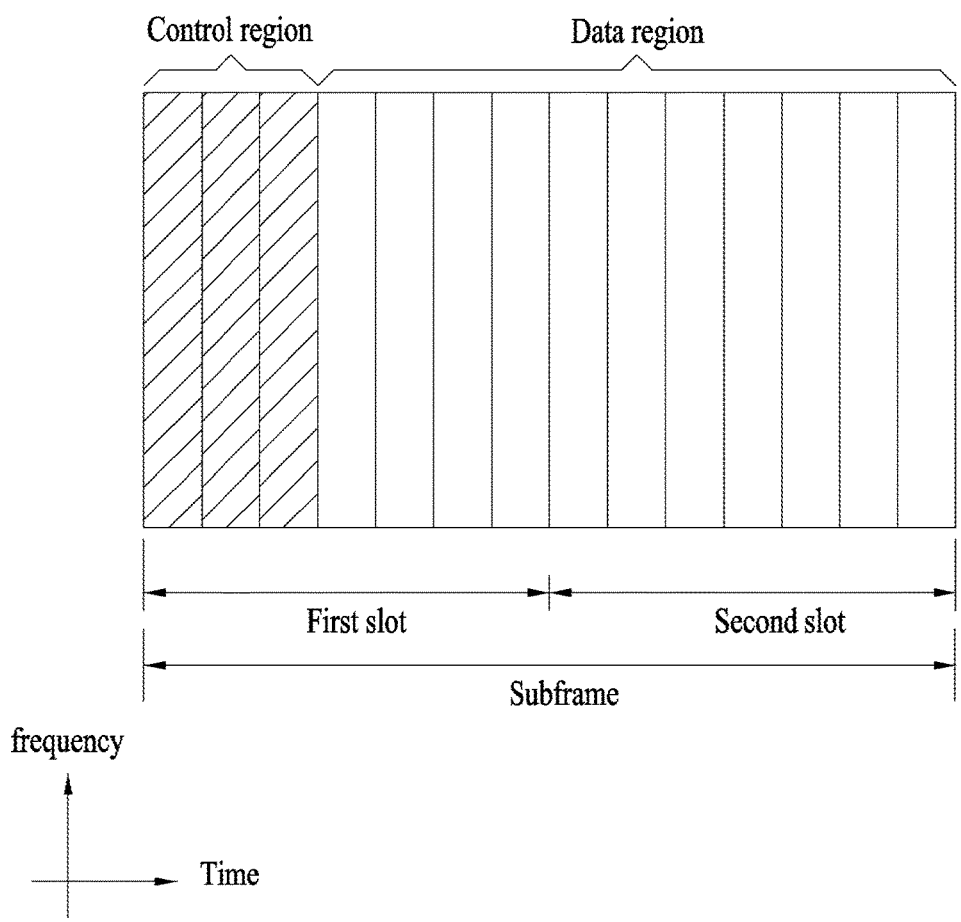
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)
1.2.1 PDCCH Overview

TABLE 1

| | | Normal cyclic prefix in downlink | | | Extended cyclic prefix in downlink | | |
| --- | --- | --- | --- | --- | --- | --- | --- |
| | | UpPTS | | | | UpPTS | |
| | | Normal | Extended | | | | |
| Special subframe configuration | DwPTS | cyclic prefix in uplink | cyclic prefix in uplink | DwPTS | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | | $2192 \cdot T_s$ | $2560 \cdot T_s$ |
| 1 | $19760 \cdot T_s$ | | | $20480 \cdot T_s$ | | | |
| 2 | $21952 \cdot T_s$ | | | $23040 \cdot T_s$ | | | |
| 3 | $24144 \cdot T_s$ | | | $25600 \cdot T_s$ | | | |
| 4 | $26336 \cdot T_s$ | | | $7680 \cdot T_s$ | | | |
| 5 | $6592 \cdot T_s$ | $4384 \cdot T_s$ | $5120 \cdot T_s$ | $20480 \cdot T_s$ | | $4384 \cdot T_s$ | $5120 \cdot T_s$ |
| 6 | $19760 \cdot T_s$ | | | $23040 \cdot T_s$ | | | |
| 7 | $21952 \cdot T_s$ | | | — | | — | — |
| 8 | $24144 \cdot T_s$ | | | — | | — | — |

Figure 3:
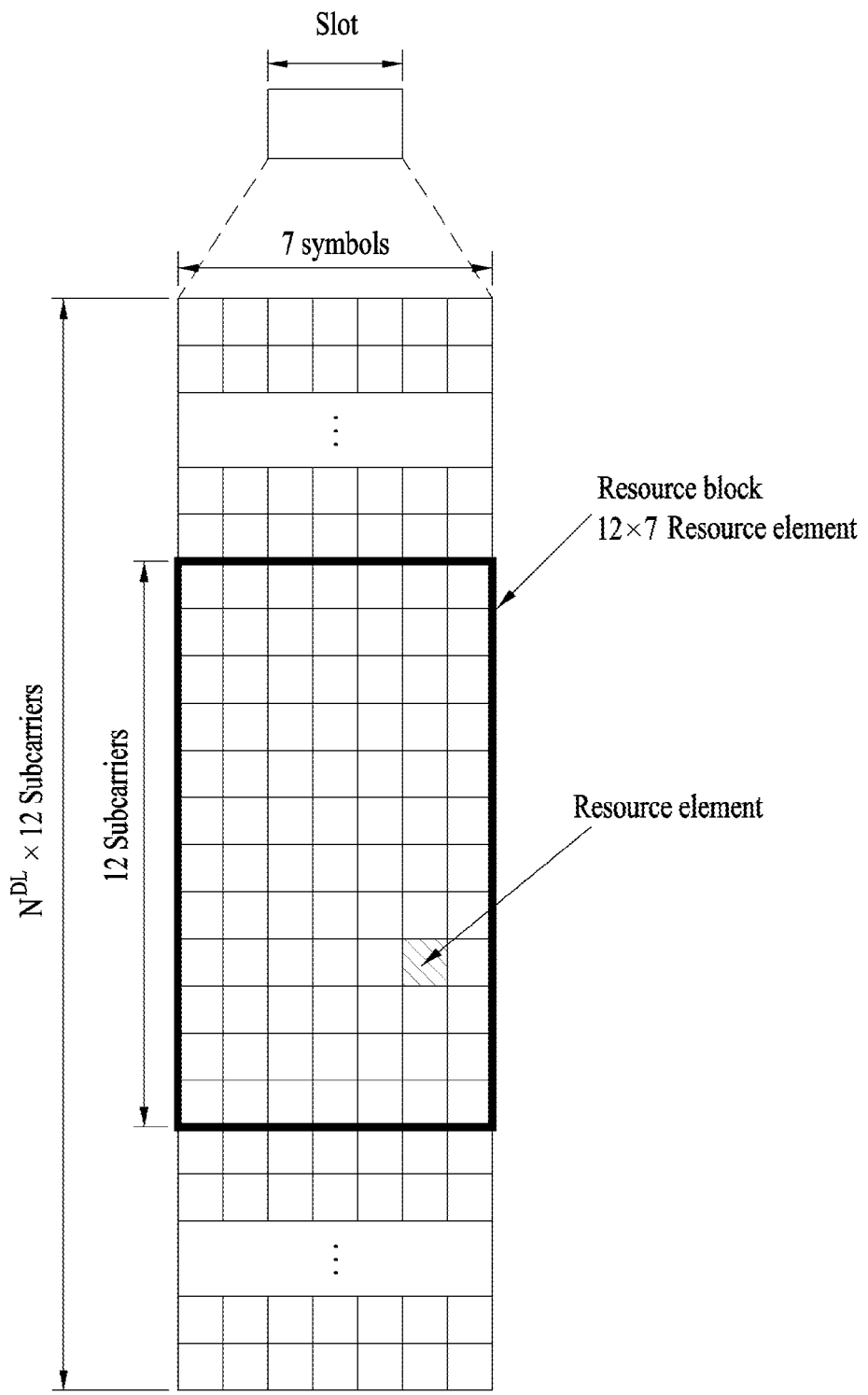
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ $(=\lfloor N_{REG}/9 \rfloor)$ and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher layer signaling (e.g. Radio Resource Control (RRC) signaling). The transmission mode may be classified as single antenna transmission or multi-antenna transmission.

A transmission mode is configured for a UE semi-statically by higher layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which does not based on a codebook (Rel-8);
(8) Transmission mode 8: Precoding supporting up to two layers, which do not based on a codebook (Rel-9);
(9) Transmission mode 9: Precoding supporting up to eight layers, which do not based on a codebook (Rel-10); and
(10) Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level L∈{1,2,4,8}. The CCEs of PDCCH candidate set m in the SS may be determined by the following equation.

$$L \cdot \{(Y_k+m) \bmod \lfloor N_{CCE,k}/L \rfloor \} + i \quad \text{[Equation 1]}$$

where $M^{(L)}$ is the number of PDCCH candidates with CCE aggregation level L to be monitored in the SS, m=0, . . . , $M^{(L)}$−1, i is the index of a CCE in each PDCCH candidate, and i=0, . . . , L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE- | 1 | 6 | 6 |
| specific | 2 | 12 | 6 |
|  | 4 | 8 | 2 |
|  | 8 | 16 | 2 |
| Common | 4 | 16 | 4 |
|  | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \quad \text{[Equation 2]}$$

where $Y_{-1} = n_{RNTI} \neq 0$, $n_{RNTI}$ indicating an RNTI value. A=39827 and D=65537.

1.3. PUCCH (Physical Uplink Control Channel)

PUCCH may include the following formats to transmit control information.

(1) Format 1: On-Off keying (OOK) modulation, used for SR (Scheduling Request)

(2) Format 1a & b: Used for ACK/NACK transmission

1) Format 1a: BPSK ACK/NACK for 1 codeword

2) Format 1b: QPSK ACK/NACK for 2 codewords (3) Format 2: QPSK modulation, used for CQI transmission (4) Format 2a & Format 2b: Used for simultaneous transmission of CQI and ACK/NACK (5) Format 3: Used for multiple ACK/NACK transmission in a carrier aggregation environment Table 6 shows a modulation scheme according to PUCCH format and the number of bits per subframe. Table 7 shows the number of reference signals (RS) per slot according to PUCCH format. Table 8 shows SC-FDMA symbol location of RS (reference signal) according to PUCCH format. In Table 6, PUCCH format 2a and PUCCH format 2b correspond to a case of normal cyclic prefix (CP).

TABLE 6

| PUCCH format | Modulation scheme | No. of bits per subframe, Mbit |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 7

| PUCCH format | Normal CP | Extended CP |
|---|---|---|
| 1, 1a, 1b | 3 | 2 |
| 2, 3 | 2 | 1 |
| 2a, 2b | 2 | N/A |

TABLE 8

| PUCCH format | SC-FDMA symbol location of RS | |
|---|---|---|
|  | Normal CP | Extended CP |
| 1, 1a, 1b | 2, 3, 4 | 2, 3 |
| 2, 3 | 1, 5 | 3 |
| 2a, 2b | 1, 5 | N/A |

Figure 6:
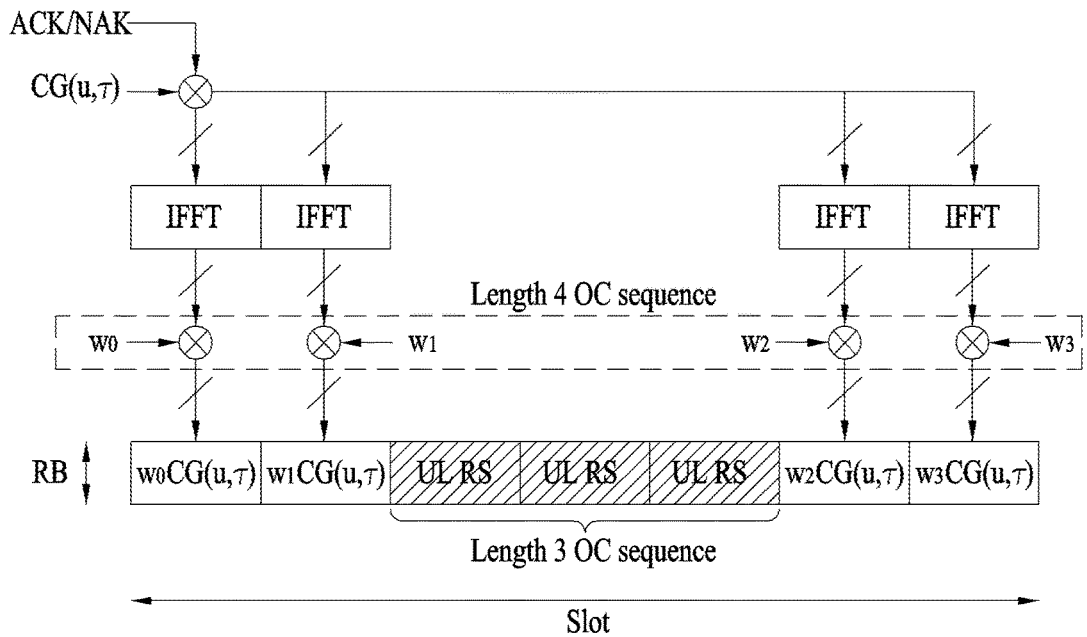
FIG. 6 illustrates Physical Uplink Control Channel (PUCCH) formats 1a and 1b for use in a normal Cyclic Prefix (CP) case.
Figure 7:
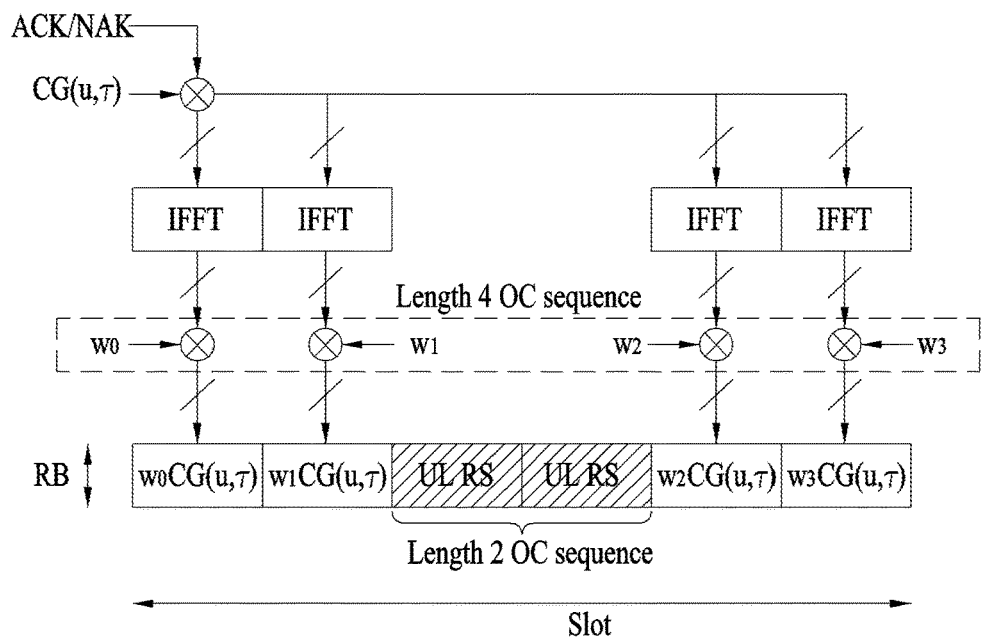
FIG. 7 illustrates PUCCH formats 1a and 1b for use in an extended CP case.

FIG. 6 shows PUCCH formats 1a and 1b in case of a normal cyclic prefix. And, FIG. 7 shows PUCCH formats 1a and 1b in case of an extended cyclic prefix.

According to the PUCCH formats 1a and 1b, control information of the same content is repeated in a subframe by slot unit. In each user equipment, ACK/NACK signal is transmitted on a different resource constructed with a different cyclic shift (CS) (frequency domain code) and an orthogonal cover (OC) or orthogonal cover code (OCC) (time domain spreading code) of CG-CAZAC (computer-generated constant amplitude zero auto correlation) sequence. For instance, the OC includes Walsh/DFT orthogonal code. If the number of CS and the number of OC are 6 and 3, respectively, total 18 user equipments may be multiplexed within the same PRB (physical resource block) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB (physical resource block) may be allocated to a user equipment through RRC (radio resource control). For non-persistent scheduling with dynamic ACK/NACK, the ACK/NACK resource may be implicitly allocated to a user equipment using a smallest CCE index of PDCCH corresponding to PDSCH.

Length-4 orthogonal sequence (OC) and length-3 orthogonal sequence for PUCCH format 1/1 a/1 b are shown in Table 9 and Table 10, respectively.

TABLE 9

| Sequence index $n_{oc}$ ($n_s$) | Orthogonal sequences [w(0) . . . w($N_{SF}^{PUCCH}$ − 1)] |
|---|---|
| 0 | [+1 +1 +1 +1] |
| 1 | [+1 −1 +1 −1] |
| 2 | [+1 −1 −1 +1] |

TABLE 10

| Sequence index $n_{oc}$ ($n_s$) | Orthogonal sequences $[w(0) \ldots w(N_{SF}^{PUCCH} - 1)]$ |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC) $[\bar{w}(0) \ldots \bar{w}(N_{RS}^{PUCCH}-1)]$ or a reference signal in PUCCH format 1/1a/1b is shown in Table 11.

TABLE 11

| Sequence index $\bar{n}_{oc}$ ($n_s$) | Normal cyclic prefix | Extended cyclic prefix |
| --- | --- | --- |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
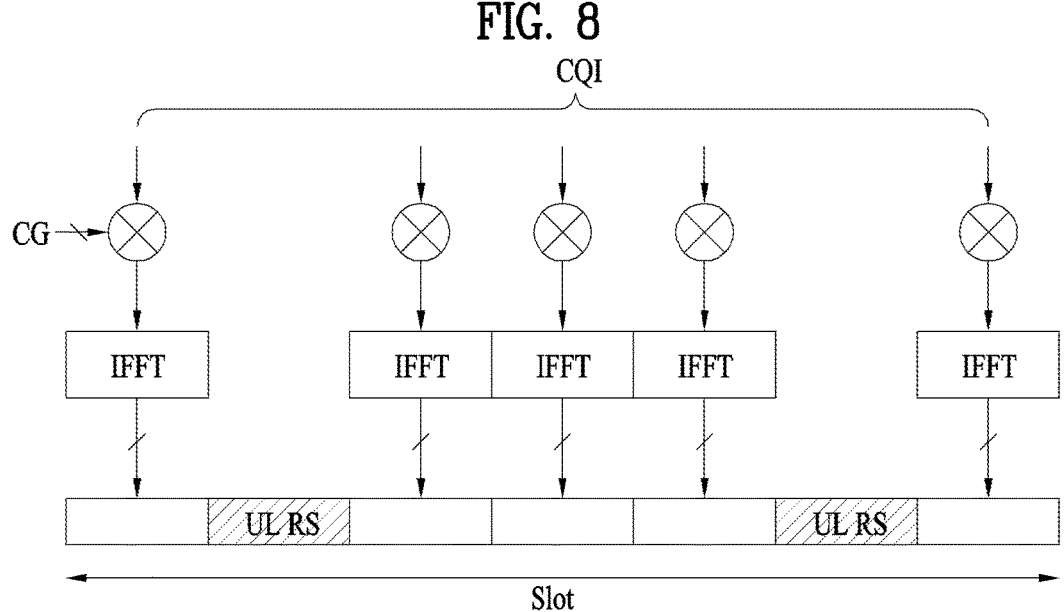
FIG. 8 illustrates PUCCH formats 2/2a/2b in a normal CP case.

FIG. 8 shows PUCCH format 2/2a/2b in case of a normal cyclic prefix. And, FIG. 9 shows PUCCH format 2/2a/2b in case of an extended cyclic prefix.

Figure 9:
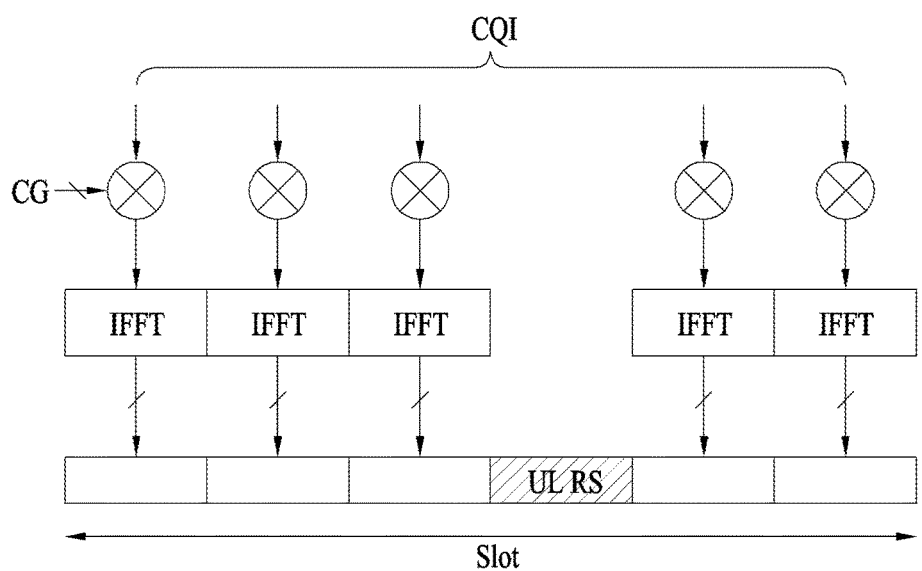
FIG. 9 illustrates PUCCH formats 2/2a/2b in an extended CP case.

Referring to FIG. 8 and FIG. 9, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 user equipments may be multiplexed in the same PRB.

For instance, assuming that the number of available CSs is 6, 6 user equipments may be multiplexed in the same PRB. In brief, a plurality of user equipments in PUCCH format 1/1a/1b and PUCCH format 2/2a/2b may be multiplexed by 'CS+OC+PRB' and 'CS+PRB', respectively.

FIG. 10 is a diagram of ACK/NACK channelization for PUCCH formats 1a and 1 b. In particular, FIG. 10 corresponds to a case of '$\Delta_{shift}^{PUCCH}=2$'

Figure 11:
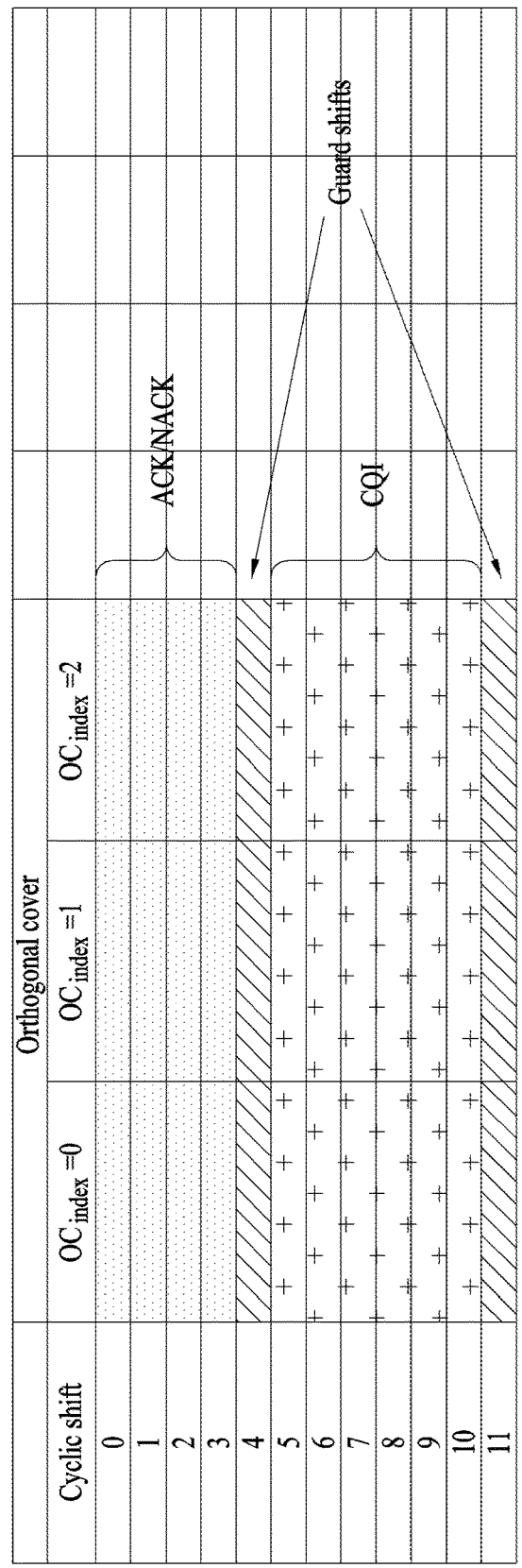
FIG. 11 illustrates channelization for a hybrid structure of PUCCH format 1a/1b and format 2/2a/2b in the same PRB.

FIG. 11 is a diagram of channelization for a hybrid structure of PUCCH format 1/1a/1b and PUCCH format 2/2a/2b.

Cyclic shift (CS) hopping and orthogonal cover (OC) remapping may be applicable in a following manner.

(1) Symbol-based cell-specific CS hopping for randomization of inter-cell interference
(2) Slot level CS/OC remapping
 1) For inter-cell interference randomization
 2) Slot based access for mapping between ACK/NACK channel and resource (k)

Meanwhile, resource $n_r$ for PUCCH format 1/1a/1b may include the following combinations.

(1) CS(=equal to DFT orthogonal code at symbol level) ($n_{cs}$)
(2) OC (orthogonal cover at slot level) ($n_{oc}$)
(3) Frequency RB (Resource Block) ($n_{rb}$)

If indexes indicating CS, OC and RB are set to $n_{cs}$, $n_{oc}$, $n_{rb}$, respectively, a representative index $n_r$ may include $n_{cs}$, $n_{oc}$ and $n_{rb}$. In this case, the $n_r$ may meet the condition of '$n_r=(n_{cs}, n_{oc}, n_{rb})$'.

The combination of CQI, PMI, RI, CQI and ACK/NACK may be delivered through the PUCCH format 2/2a/2b. And, Reed Muller (RM) channel coding may be applicable.

For instance, channel coding for UL (uplink) CQI in LTE system may be described as follows. First of all, bitstreams $a_0, a_1, a_2, a_3, \ldots a_{A-1}$ may be coded using (20, A) RM code. In this case, $a_o$ and $a_{A-1}$ indicates MSB (Most Significant Bit) and LSB (Least Significant Bit), respectively. In case of an extended cyclic prefix, maximum information bits include 11 bits except a case that QI and ACK/NACK are simultaneously transmitted. After coding has been performed with 20 bits using the RM code, QPSK modulation may be applied. Before the BPSK modulation, coded bits may be scrambled.

Table 12 shows a basic sequence for (20, A) code.

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
| --- | --- | --- | --- | --- | --- | --- | --- | --- | --- | --- | --- | --- | --- |
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 0 | 1 | 1 | 0 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by [Equation 3].

$$b_i = \sum_{n=0}^{A-1} (a_n \cdot M_{i,n}) \bmod 2 \qquad \text{[Equation 3]}$$

In [Equation 3], 'i=0, 1, 2, . . . , B−1' is met.

In case of wideband repots, a bandwidth of UCI (uplink control information) field for CQI/PMI can be represented as [Table 8] to [Table 10] in the following.

[Table 13] shows UCI (Uplink Control Information) field for broadband report (single antenna port, transmit diversity) or open loop spatial multiplexing PDSCH CQI feedback.

TABLE 13

| Field | Bandwidth |
|---|---|
| Broadband CQI | 4 |

[Table 14] shows UL control information (UCI) field for CQI and PMI feedback in case of wideband reports (closed loop spatial multiplexing PDSCH transmission).

TABLE 14

| | Bandwidth | | | |
|---|---|---|---|---|
| | 2 antenna ports | | 4 antenna ports | |
| Field | rank = 1 | rank = 2 | rank = 1 | Rank >1 |
| Wideband CQI | 4 | 4 | 4 | 4 |
| Spatial differential CQI | 0 | 3 | 0 | 3 |
| Precoding Matrix Indication | 2 | 1 | 4 | 4 |

[Table 15] shows UL control information (UCI) field for RI feedback in case of wideband reports.

TABLE 15

| | Bit widths | | |
|---|---|---|---|
| | | 4 antenna ports | |
| Field | 2 antenna ports | Max. 2 layers | Max. 4 layers |
| Rank Indication | 1 | 1 | 2 |

Figure 12:
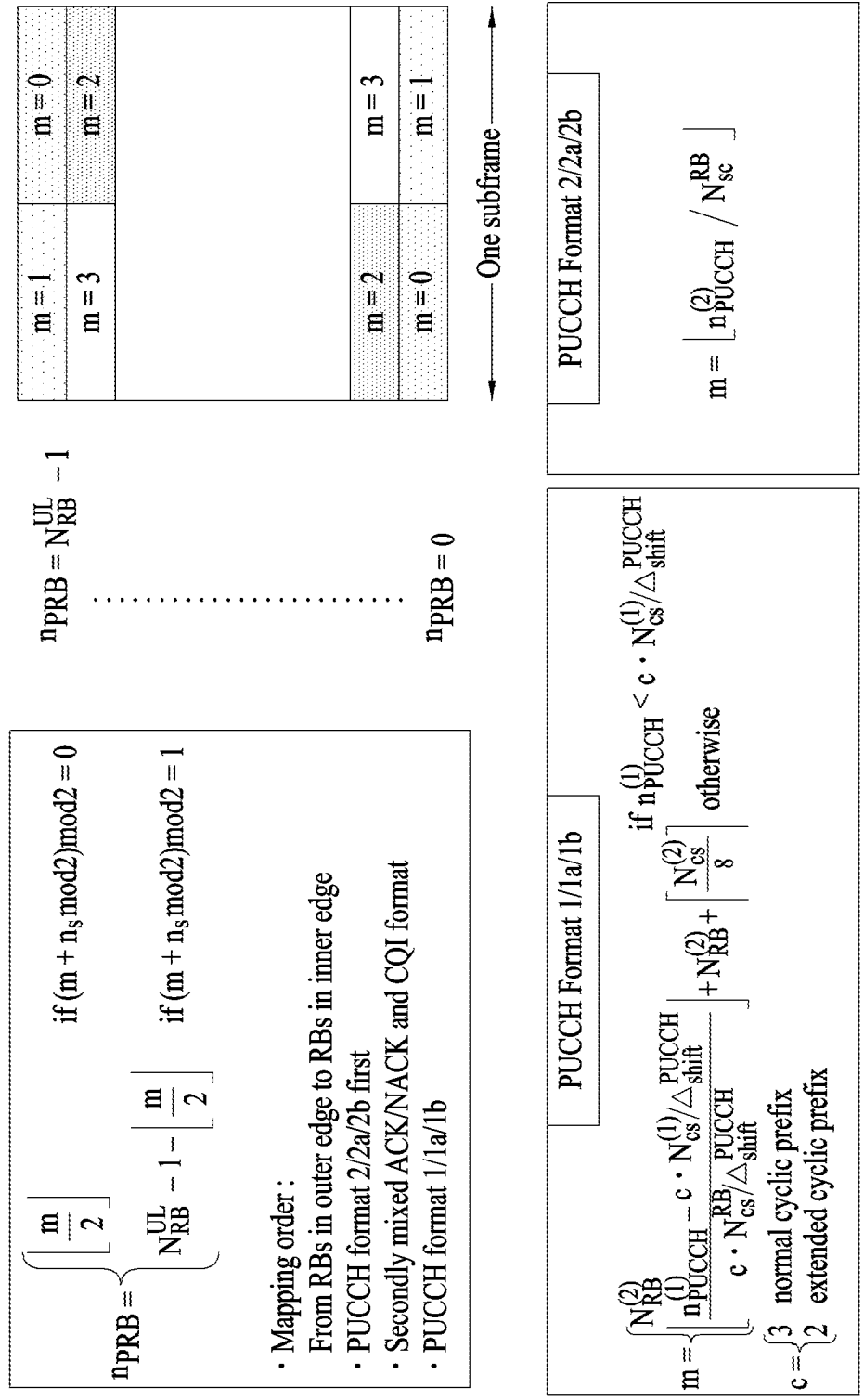
FIG. 12 illustrates allocation of a Physical Resource Block (PRB).

FIG. 12 is a diagram for PRB allocation. Referring to FIG. 12, PRB may be usable for PUCCH transmission in a slot $n_s$.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 13:
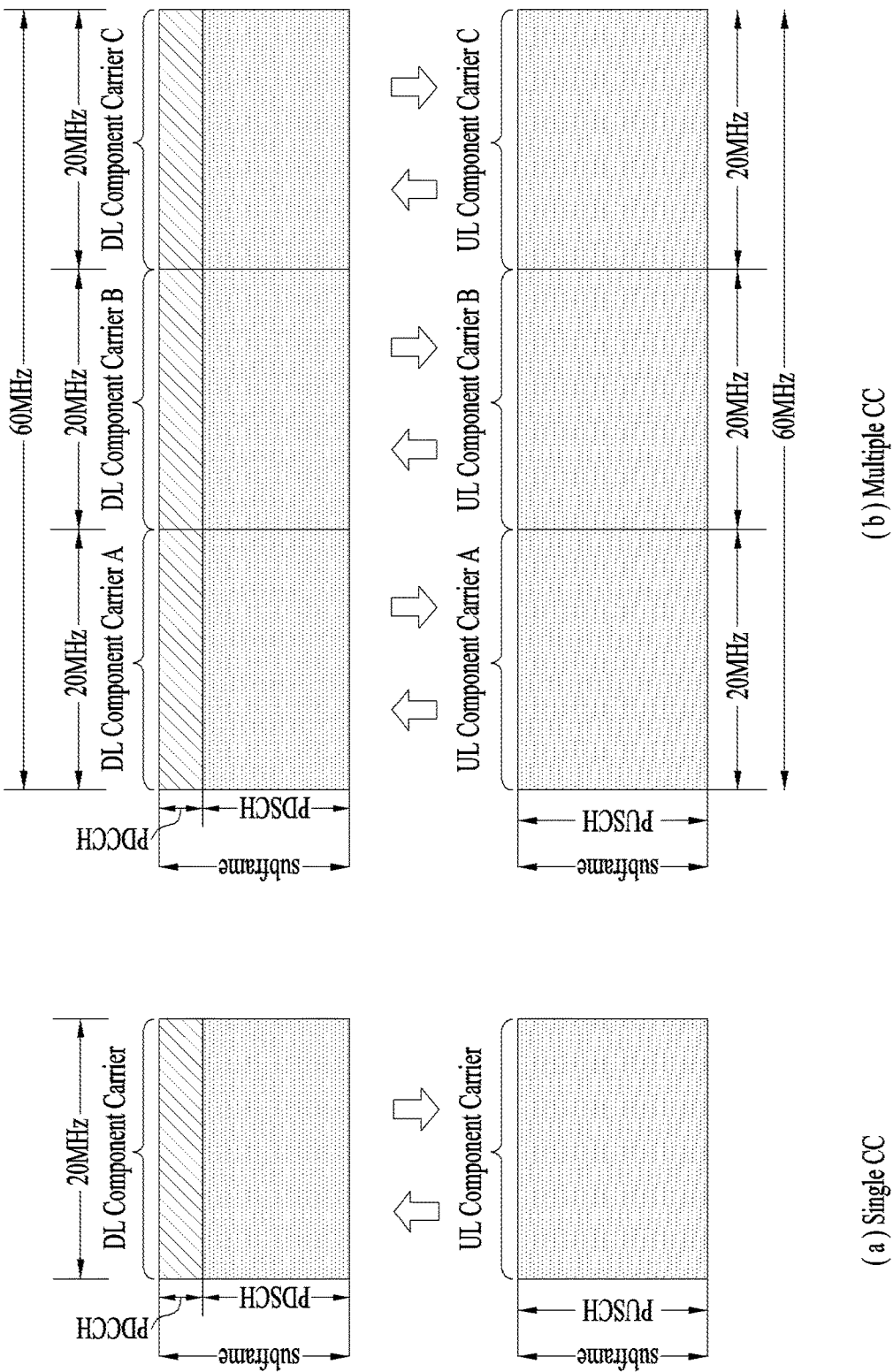
FIG. 13 is a diagram illustrating an example of a Component Carrier (CC) of the embodiments and Carrier Aggregation (CA) used in a Long Term Evolution-Advanced (LTE-A) system.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
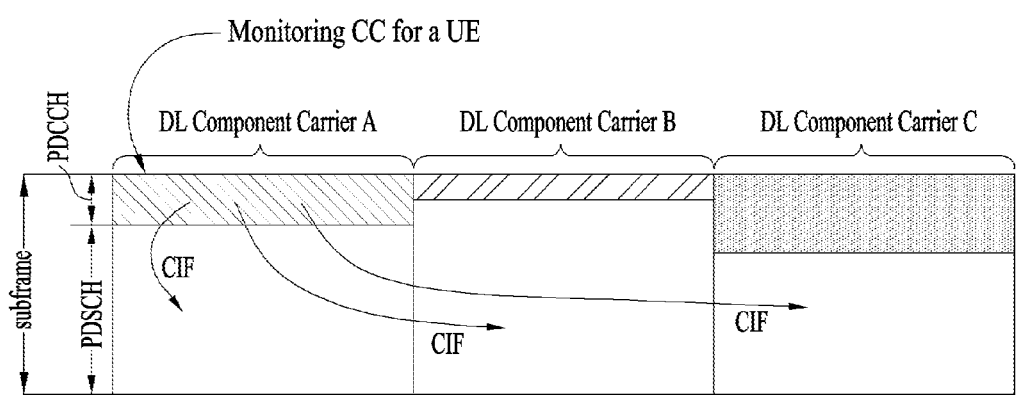
FIG. 14 illustrates a subframe structure of an LTE-A system according to cross-carrier scheduling.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
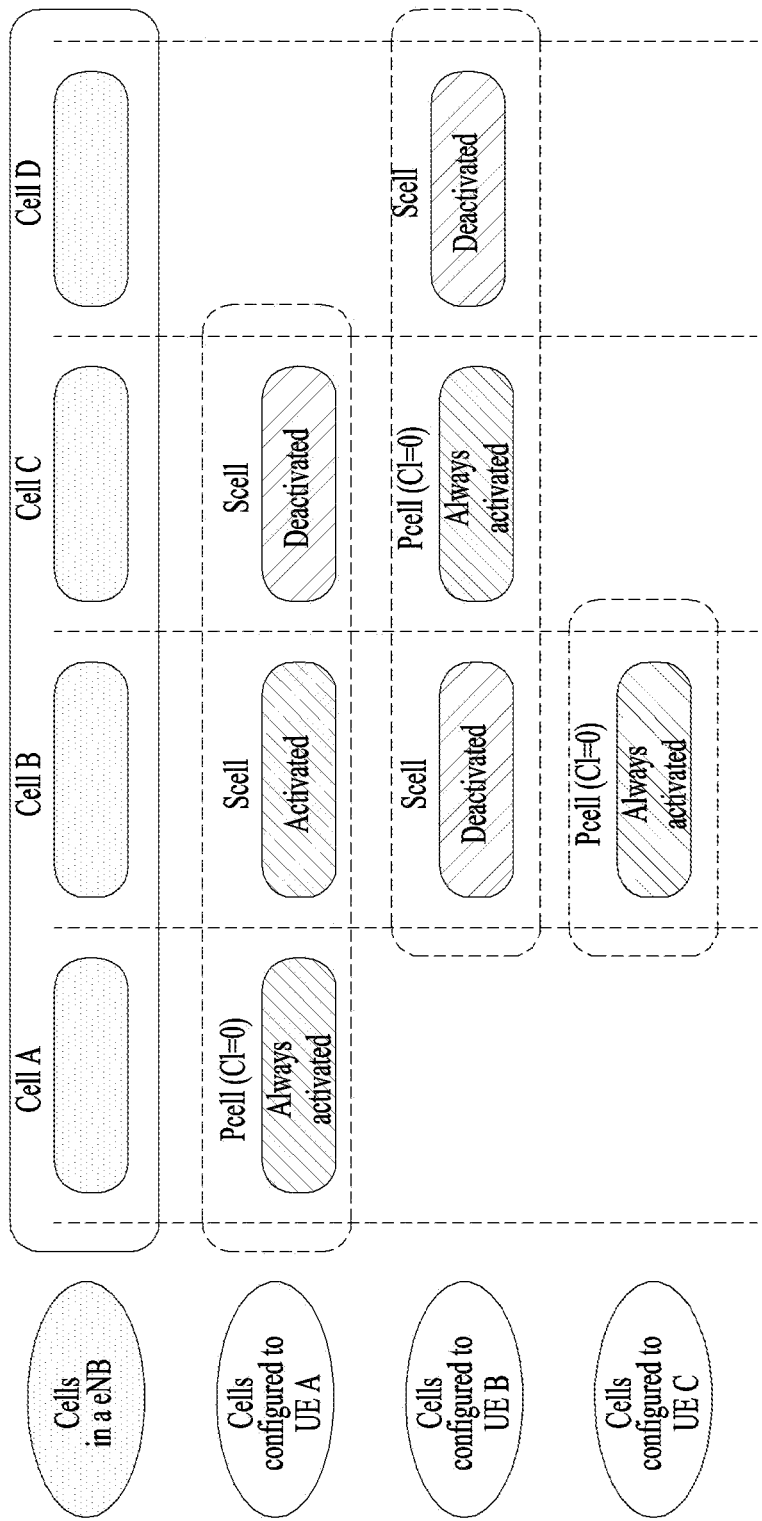
FIG. 15 is a conceptual diagram illustrating a construction of serving cells according to cross-carrier scheduling.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 15 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA PUCCH (Carrier Aggregation Physical Uplink Control Channel)

In a wireless communication system supportive of carrier aggregation, PUCCH format for feeding back UCI (e.g., multi-ACK/NACK bit) can be defined. For clarity of the following description, such PUCCH format shall be named CA PUCCH format.

Figure 16:
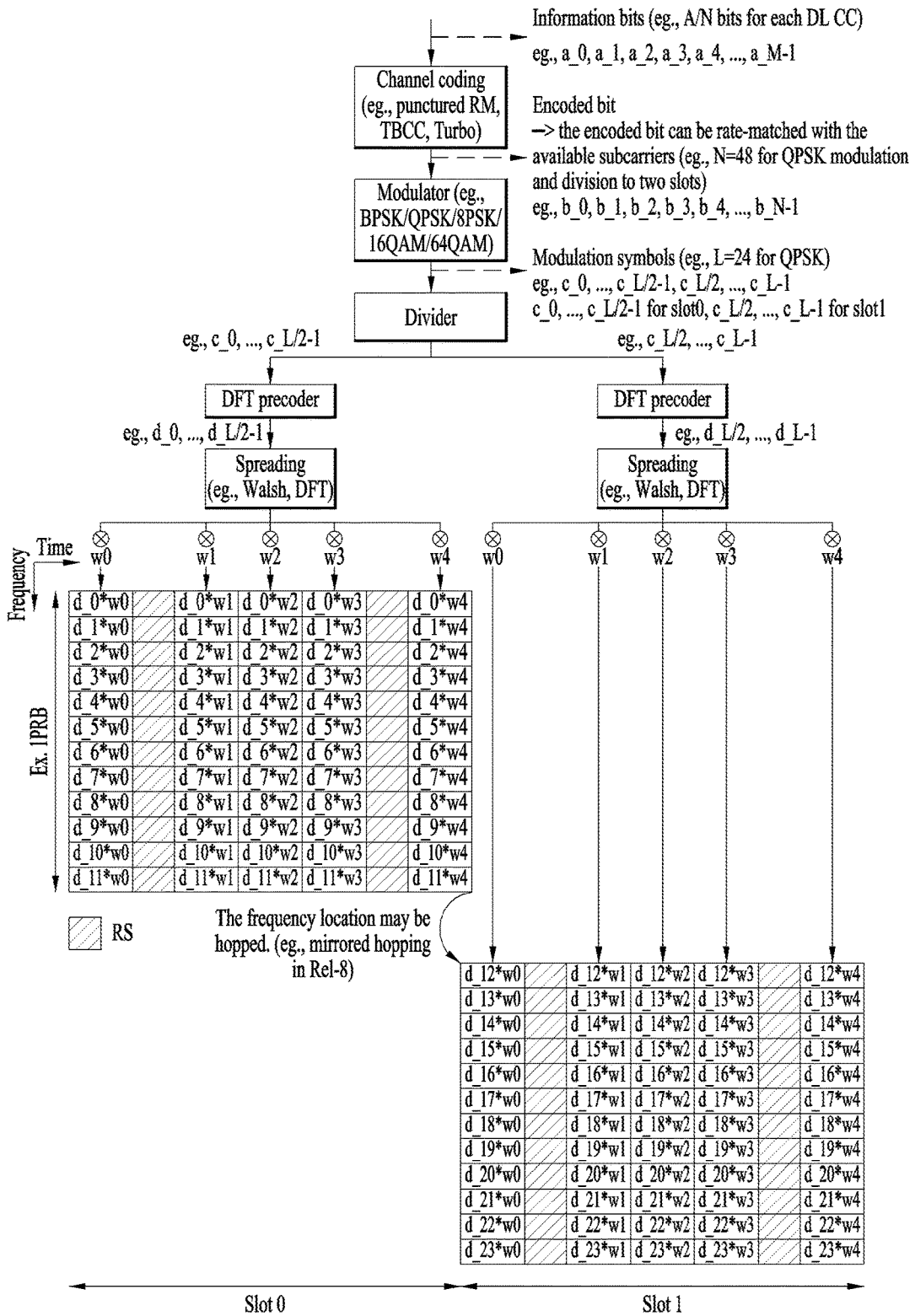
FIG. 16 is a conceptual diagram illustrating CA PUCCH signal processing.

FIG. 16 is a diagram for one example of a signal processing process of CA PUCCH.

Referring to FIG. 16, a channel coding block generates coding bits (e.g., encoded bits, coded bits, etc.) (or codeword) $b\_0, b\_1, \ldots$ and $b\_N-1$ by channel-coding information bits $a\_0, a\_1,$ and $a\_M-1$ (e.g., multiple ACK/NACK bits). In this case, the M indicates a size of information bits and the N indicates a size of the coding bits. The information bits may include multiple ACK/NACK for UL control information (UCI), e.g., a plurality of data (or PDSCH) received via a plurality of DL CCS. In this case, the information bits $a\_0, a\_1, a\_M-1$ may be joint-coded irrespective of type/number/size of the UCI configuring the information bits. For instance, in case that information bits include multiple ACK/NACK for a plurality of DL CCs, channel coding may not be performed per DL CC or individual ACK/NACK bit but may be performed on all bit information, from which a single codeword may be generated. And, channel coding is non-limited by this. Moreover, the channel coding may include one of simplex repetition, simplex coding, RM (Reed Muller) coding, punctured RM coding, TBCC (tail-biting convolutional coding), LDPC (low-density parity-check), turbo coding and the like. Besides, coding bits may be rate-matched in consideration of a modulation order and a resource size (not shown in the drawing). A rate matching function may be included as a part of the channel coding block or may be performed via a separate function block.

A modulator generates modulated symbols $c\_0, c\_1 \ldots c\_L-1$ by modulating coding bits $b\_0, b\_1 \ldots b\_N-1$. In this case, the L indicates a size of modulated symbol. This modulation scheme may be performed in a manner of modifying a size and phase of a transmission signal. For instance, the modulation scheme may include one of n-PSK (Phase Shift Keying), n-QAM (Quadrature Amplitude Modulation) and the like, where n is an integer equal to or greater than 2. In particular, the modulation scheme may include one of BPSK (Binary PSK), QPSK (Quadrature PSK), 8-PSK, QAM, 16-QAM, 64-QAM and the like.

A divider divides the modulated symbols $c\_0, c\_1 \ldots c\_L-1$ to slots, respectively. A sequence/pattern/scheme for dividing the modulated symbols to the slots may be specially non-limited. For instance, the divider may be able to divide the modulated symbols to the corresponding slots in order from a head to tail (Localized scheme). In doing so, as shown in the drawing, the modulated symbols $c\_0, c\_1 \ldots c\_L/2-1$ may be divided to the slot 0 and the modulated symbols $c\_L/2, c\_L/2+1 \ldots c\_L-1$ may be divided to the slot 1. Moreover, the modulated symbols may be divided to the corresponding slots, respectively, by interleaving or permutation. For instance, the even-numbered modulated symbol may be divided to the slot 0, while the odd-numbered modulated symbol may be divided to the slot 1. The modulation scheme and the dividing scheme may be switched to each other in order.

A DFT precoder may perform DFT precoding (e.g., 12-point DFT) on the modulated symbols divided to the corresponding slots to generate a single carrier waveform. Referring to the drawing, the modulated symbols $c\_0, c\_1 \ldots c\_L/2-1$ divided to the corresponding slot 0 may be DFT-precoded into DFT symbols $d\_0, d\_1 \ldots d\_L/2-1$, and the modulated symbols $c\_L/2, c\_L/2+1 \ldots c\_L-1$ divided to the slot 1 may be DFT-precoded into DFT symbols $d\_L/2, d\_L/2+1 \ldots d\_L-1$. Moreover, the DFT precoding may be replaced by another linear operation (e.g., Walsh precoding) corresponding thereto.

A spreading block may spread the DFT-performed signal at SC-FDMA symbols level (e.g., time domain). The time-domain spreading at the SC-FDMA level may be performed using a spreading code (sequence). The spreading code may include pseudo orthogonal code and orthogonal code. The pseudo orthogonal code may include PN (pseudo noise) code, by which the pseudo orthogonal code may be non-limited. The orthogonal code may include Walsh code and DFT code, by which the orthogonal code may be non-limited. The orthogonal code (OC) may be interchangeably used with one of an orthogonal sequence, an orthogonal cover (OC) and an orthogonal cover code (OCC). In this specification, for example, the orthogonal code may be mainly described as a representative example of the spreading code for clarity and convenience of the following description. Optionally, the orthogonal code may be substituted with the pseudo orthogonal code. A maximum value of a spreading code size (or a spreading factor: SF) may be limited by the number of SC-FDAM symbols used for control information transmission. For example, in case that 5 SC-FDMA symbols are used in one slot for control information transmission, orthogonal codes (or pseudo orthogonal codes) $w0, w1, w2, w3$ and $w4$ of length 5 may be used per slot. The SF may mean a spreading degree of the control information and may be associated with a multiplexing order or an antenna multiplexing order of a user equipment. The SF may be variable like 1, 2, 3, 4, 5 . . . depending on a requirement of a system. The SF may be defined in advance between a base station and a user equipment. And, the SF may be notified to a user equipment via DCI or RRC signaling.

The signal generated through the above-described process may be mapped to subcarrier within the PRB and may be then transformed into a time-domain signal through IFFT. CP may be attached to the time-domain signal. The generated SC-FDMA symbol may be then transmitted through an RF stage.

3. Method for Feeding Back Channel State Information (CSI)

3.1 Channel State Information (CSI)

First of all, in the 3GPP LTE system, when a DL reception entity (e.g., a user equipment) is connected to a DL transmission entity (e.g., a base station), the DL reception entity performs measurement on a reference signal received power (RSRP) of a reference signal transmitted in DL, a quality of a reference signal (RSRQ: reference signal received quality) and the like at a random time and is then able to make a periodic or even-triggered report of a corresponding measurement result to the base station.

Each user equipment reports a DL channel information in accordance with a DL channel status via uplink. A base station is then able to determine time/frequency resources, MCS (modulation and coding scheme) and the like appropriate for a data transmission to each user equipment using the DL channel information received from the each user equipment.

Such channel state information (CSI) may include CQI (Channel Quality Indication), PMI (Precoding Matrix Indicator), PTI (Precoder Type Indication) and/or RI (Rank Indication). In particular, the CSI may be transmitted entirely or partially depending on a transmission mode of each user equipment. CQI is determined based on a received signal quality of a user equipment, which may be generally determined on the basis of a measurement of a DL reference signal. In doing so, a CQI value actually delivered to a base station may correspond to an MCS capable of providing maximum performance by maintaining a block error rate (BLER) under 10% in the received signal quality measured by a user equipment.

This channel information reporting may be classified into a periodic report transmitted periodically and an aperiodic report transmitted in response to a request made by a base station.

In case of the aperiodic report, it is set for each user equipment by a 1-bit request bit (CQI request bit) contained in UL scheduling information downloaded to a user equipment by a base station. Having received this information, each user equipment is then able to deliver channel information to the base station via a physical uplink shared channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each user equipment by subframe unit and channel information in consideration of a transmission mode of each user equipment may be delivered to a base station via a physical uplink control channel (PUCCH) in accordance with a determined period. In case that data transmitted in uplink simultaneously exists in a subframe in which channel information is transmitted by a determined period, the corresponding channel information may be transmitted together with the data not on the physical uplink control channel (PUCCH) but on a physical uplink shared channel (PUSCH). In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

[Table 16] is provided to describe CSI feedback type transmitted on PUCCH and PUCCH CSI report mode.

TABLE 16

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI >1, CQI of first codeword | Mode 1-1<br>RI<br>Wideband CQI (4 bit)<br>Wideband spatial CQI (3 bit) for RI >1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI >1, CQI of first codeword | Mode 2-1<br>RI<br>Wideband CQI (4 bit)<br>Wideband spatial CQI (3 bit) for RI >1<br>Wideband PMI (4 bit)<br>Best-1 CQI (4 bit) 1 in each BP<br>Best-1 spatial CQI (3 bit) for RI >1<br>Best-1 indicator (L-bit label) |

Referring to [Table 16], in the periodic report of channel information, there are 4 kinds of reporting modes (mode 1-0, mode 1-2, mode 2-0 and mode 2-1) in accordance with CQI and PMI feedback types.

CQI can be classified into WB (wideband) CQI and SB (subband) CQI in accordance with CQI feedback type and PMI can be classified into No PMI or Single PMI in accordance with a presence or non-presence of PMI transmission. In Table 11, No PMI corresponds to a case of open-loop (OL), transmit diversity (TD) and single-antenna, while Single PMI corresponds to a case of closed-loop (CL).

The mode 1-0 corresponds to a case that WB CQI is transmitted in the absence of PMI transmission. In this case, RI is transmitted only in case of open-loop (OL) spatial multiplexing (SM) and one WB CQI represented as 4 bits can be transmitted. If RI is greater than 1, CQI for a $1^{st}$ codeword can be transmitted.

The mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB (wideband) spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

The mode 2-0 corresponds to a case that CQI on a UE-selected band is transmitted in the absence of PMI transmission. In this case, RI is transmitted only in case of open-loop spatial multiplexing (SM) and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQI for a $1^{st}$ codeword can be transmitted.

And, the mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each bandwidth part (BP) and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.

1) Transmission mode 1: Modes 1-0 and 2-0
2) Transmission mode 2: Modes 1-0 and 2-0.
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a user equipment is set to make a PMI/RI reporting, or Modes 1-0 and 2-0 if a user equipment is set not to make a PMI/RI reporting
9) Transmission mode 9: Modes 1-1 and 2-1 if a user equipment is set to make a PMI/RI reporting and the number of CSI-RS ports is greater than 1, or Modes 1-0 and 2-0 if a user equipment is set not to make a PMI/RI reporting and the number of CSI-RS port(s) is equal to 1.

The periodic PUCCH CSIU reporting mode in each serving cell is set by upper layer signaling. And, the mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a bandwidth part (BP) corresponding to a portion of a bandwidth of a serving cell. An index is given to the bandwidth part in a frequency increasing order starting with a lowest frequency without an increment of a bandwidth.

3.2 CSI Feedback Method

In an LTE system, an open-loop MIMO scheme operated without channel information and a closed-loop MIMO scheme operated based on channel information are used. Especially, according to the closed-loop MIMO scheme, each of a transmitter and a receiver may be able to perform beamforming based on channel information (e.g., CSI) to obtain a multiplexing gain of MIMO antennas. To obtain CSI, the eNB allocates a physical uplink control channel (PUCCH) or a physical uplink shared channel (PUSCH) to the UE and instructs the UE to feed back CSI of a downlink channel.

CSI includes Rank Indicator (RI) information, Precoding Matrix Indicator (PMI) information, and Channel Quality Indicator (CQI) information. First, RI indicates rank information of a channel and means the number of data streams that can be received by the UE via the same frequency-time resource. Since RI is dominantly determined by long-term fading of a channel, this may be generally fed back from the UE to the eNB at a cycle longer than that of PMI or CQI. PMI is a value to which the spatial characteristic of a channel is reflected. PMI indicates a precoding index of the eNB preferred by the UE based on a metric of signal-to-interference plus noise ratio (SINR). Lastly, CQI is information indicating the strength of a channel and generally indicates a reception SINR obtainable when the eNB uses PMI.

In an advanced system such as an LTE-A system, a method for obtaining additional multi-user diversity using multi-user MIMO (MU-MIMO) was added. Higher accuracy is required in terms of channel feedback. Since an interference channel exists between UEs multiplexed in an antenna domain in MU-MIMO, the accuracy of CSI may significantly affect interference with other multiplexed UEs as well as a UE for performing feedback. Accordingly, in an LTE-A system, in order to increase accuracy of a feedback channel, a final PMI has been determined to be separately designed as a long-term and/or wideband PMI, W1, and a short-term and/or subband PMI, W2.

The eNB can transform a codebook using a long-term covariance matrix of a channel as shown in [Equation] 4 below as an example of a hierarchical codebook transformation method configuring one final PMI from two types of channel information such as W1 and W2.

$$W = \text{norm}(W1\,W2) \quad \text{[Equation 4]}$$

In [Equation 4], W1 (that is, long-term PMI) and W2 (that is, short-term PMI) denote codewords of a codebook generated in order to reflect channel information, W denotes a codeword of a final transformed codebook, and norm(A) denotes a matrix obtained by normalizing the norm of each column of a matrix A to 1.

In [Equation 4], the structures of W1 and W2 are shown in [Equation 5] below.

$$W1(i) = \begin{bmatrix} X_i & 0 \\ 0 & X_i \end{bmatrix}, \quad \text{[Equation 5]}$$

where $X_i$ is $Nt/2$ by $M$ matrix.

$$W2(j) = \overbrace{\begin{bmatrix} e_M^k & e_m^l & \cdots & e_M^m \\ \alpha_j e_M^k & \beta_j e_M^l & \cdots & \gamma_j e_M^m \end{bmatrix}}^{r\,columns}$$

(if rank = $r$),

-continued where $1 \leq k, l, m \leq M$ and $k, l, m$ are integer.

The codeword structures of W1 and W2 shown in [Equation 5] are designed by reflecting correlation characteristics of the channel generated when a cross-polarized antenna is used and a gap between antennas is narrow (e.g., a distance between adjacent antennas is equal to or less than half a signal wavelength).

The cross-polarized antennas may be divided into a horizontal antenna group and a vertical antenna group. At this time, each antenna group has a uniform linear array (ULA) antenna property and two antenna groups are co-located. Accordingly, the correlations between antennas in each group have the same linear phase increment property and the correlation between the antenna groups has a phase rotation property.

Since a codebook is a value obtained by quantizing radio channels, a codebook may be designed by reflecting the characteristics of a channel corresponding to a source without change. [Equation 6] below shows an example of a rank-1 codeword designed using the structures of Equations 4 and 5, for convenience of description. Referring to [Equation 6], it can be seen that such channel properties are reflected to the codeword satisfying [Equation 4].

$$W1(i) * W2(j) = \begin{bmatrix} X_i(k) \\ \alpha_j X_i(k) \end{bmatrix} \quad \text{[Equation 6]}$$

In [Equation 6], a codeword is expressed as an $N_t$ (that is, the number of transmit antennas)×1 vector. At this time, [Equation 6] is composed of an upper vector $X_i(k)$ and a lower vector $\alpha_j X_i(k)$, which respectively represent the correlation characteristics of the horizontal and vertical antenna groups. At this time, $X_i(k)$ is expressed as a vector having the linear phase increment property by reflecting the correlation characteristics between antenna groups. A representative example thereof includes a discrete Fourier transform (DFT) matrix.

In addition, higher channel accuracy is necessary for CoMP. For example, CoMP joint transmission (JP) may be theoretically regarded as a MIMO system in which antennas are geographically distributed, because several eNBs cooperatively transmit the same data to a specific UE. That is, even when MU-MIMO is implemented in JT, very high channel accuracy is required to avoid interference between UEs scheduled together, similarly to single cell MU-MIMO operation. Even in CoMP coordinated beamforming (CB), precise channel information is required to avoid interference with a serving cell caused by a neighbor cell.

3.3 UE Operation for CSI Reporting

Time and frequency resources used by the UE to report CSI including CQI, PMI, precoding type indicator (PTI) and/or RI are scheduled by the eNB. For spatial multiplexing (SM), the UE shall determine RI corresponding to the number of transmission layers. For transmit diversity, the UE sets RI to 1.

A UE in transmission mode 8 or 9 is configured with or without PMI/RI reporting by a higher layer parameter pmi-RI-report. A UE is configured with resource-restricted CSI measurements if subframe sets $C_{CSI,0}$ and $C_{CSI,1}$ are configured by a higher layer.

When a UE is configured with one or more serving cells, the UE performs a CSI reporting only for activated serving cells. When the UE is not configured for simultaneous PUSCH and PUCCH transmission, the UE periodically performs CSI reporting on the PUCCH in the subframe with no PUSCH allocation. When the UE is not configured for simultaneous PUSCH and PUCCH transmission, the UE performs periodic CSI reporting in a subframe to which the PUSCH of a serving cell having a smallest serving cell index ServCellIndex is allocated. At this time, the UE uses the same format as the PUCCH-based periodic CSI reporting format on the PUSCH. Under a predetermined condition, the UE transmits periodic CSI reporting on the PUSCH. For example, for aperiodic CQI/PMI reporting, RI reporting is transmitted only when the configured CSI feedback type supports RI reporting.

In addition, even when the UE periodically performs CSI reporting, the UE may aperiodically perform CSI reporting when UL grant, in which a CSI request field is set, is received from the eNB.

3.3.1 Aperiodic CSI Reporting Using PUSCH

The UE performs aperiodic CSI reporting using the PUSCH in a subframe n+k, upon receiving an uplink DCI format (that is, UL grant) or random access response grant, in which a CSI request field is set, in a subframe n of a serving cell c. When the CSI request field has 1 bit and is set to "1", the CSI reporting request is triggered for the serving cell c. When the CSI request field has 2 bits, the CSI reporting request is triggered according to Table 17 below.

TABLE 17

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In [Table 17], the CSI request field set to "00" indicates that no aperiodic CSI report is triggered, "01" indicates that the aperiodic CSI report is triggered for the serving cell c, "10" indicates that the aperiodic CSI report is triggered for a first set of serving cells configured by higher layers, and "11" indicates that the aperiodic CSI report is triggered for a second set of serving cells configured by higher layers.

A UE is not expected to receive more than one aperiodic CSI report request for a given subframe.

[Table 18] below lists reporting modes for CSI transmission on a PUSCH.

TABLE 18

| | | PMI feedback type | | |
|---|---|---|---|---|
| | | No PMI | Single PMI | Multiple PMI |
| PUSCH CQI feedback | Wideband (wideband CQI) | | | Mode 1-2 |

TABLE 18-continued

| | | PMI feedback type | | |
|---|---|---|---|---|
| | | No PMI | Single PMI | Multiple PMI |
| type | UE Selected (subband CQI) | Mode 2-0 | | Mode 2-2 |
| | Higher Layer-configured (subband CQI) | Mode 3-0 | Mode 3-1 | |

Transmission modes listed in [Table 18] are selected by a higher layer, and a CQI, a PMI, and an RI are transmitted in the same PUSCH subframe. A detailed description will be given of each reporting mode.

1-1) Mode 1-2

A UE selects a precoding matrix for each subband on the assumption that data is transmitted only in the subband. The UE generates CQI on the assumption of a previously selected precoding matrix for a system band or all bands (set S) indicated by the higher layer. Further, the UE transmits the CQI and a PMI for each subband. Herein, the size of each subband may vary with the size of the system band.

1-2) Mode 2-0

The UE selects M preferred subbands for a system band or a band (set S) indicated by the higher layer. The UE generates one CQI on the assumption that data is transmitted in the selected M subbands. The UE additionally generates one wideband CQI for the system band or the set S. If there are a plurality of codewords for the selected M subbands, the UE defines a CQI for each codeword as a differential value. Herein, differential CQIs are set to values obtained by subtracting a wideband CQI index from indexes corresponding to CQIs for the selected M subbands.

The UE transmits information about the positions of the selected M subbands, one CQI for the selected M subbands, and a CQI for the total band or the set S. Herein, the size of a subband and M may vary with the size of the system band.

1-3) Mode 2-2

The UE simultaneously selects the positions of M preferred subbands and a single precoding matrix for the M preferred subbands on the assumption that data is transmitted in the M preferred subbands. Herein, a CQI is defined per codeword for the M preferred subbands.

The UE additionally generates a wideband CQI for the system band or the set S.

The UE transmits information about the positions of the M preferred subbands, one CQI for the M selected subbands, a single precoding matrix index for the M preferred subbands, a wideband precoding matrix index, and a wideband CQI. Herein, the size of a subband and M may vary with the size of the system band.

1-4) Mode 3-0

The UE generates and reports a windeband CQI.

The UE generates a CQI for each subband on the assumption that data is transmitted in the subband. Herein, even though an RI>1, a CQI represents only a CQI value for a first codeword.

1-5) Mode 3-1

The UE generates a single precoding matrix for the system band or the set S.

The UE generates a subband CQI per codeword on the assumption of a previously generated single precoding matrix for each subband.

The UE generates a wideband CQI on the assumption of a single precoding matrix. Herein, a CQI for each subband is expressed as a differential value. For example, a subband CQI is defined as a value obtained by subtracting a wideband CQI index from a subband CQI index (Subband CQI=subband CQI index−wideband CQI index). Also, the size of a subband may vary with the size of the system band.

4. CSI Feedback Method of MTC UE 4.1 MTC UE

MTC refers to communication between machines without human intervention. MTC may diversify services and related terminals. At present, an MTC service field considered most promising is smart metering. A smart meter used for smart metering is at once a measuring device for measuring an amount of using electricity, water, gas, etc. and a transmission device for transmitting various related information through a communication network.

For example, the smart meter transmits an amount of using electricity, water, gas, etc. periodically or aperiodically to a management center through a communication network. The communication network may use a licensed band such as a cellular network or an unlicensed band such as a Wi-Fi network. The present invention considers MTC communication over an LTE network which is one of cellular networks.

Regarding an MTC service, a UE should transmit data to an eNB periodically. Although a data transmission period is different according to a setting of a service provider, it is assumed that the data transmission period is very long. Meanwhile, the basic operation of an MTC UE supporting smart metering is to measure electricity, gas, and water. Therefore, the smart meter (i.e., the MTC UE) may be installed in a poorer environment than a general terminal. For example, the smart meter may be installed in a poor communication environment such as a baseband or a shielded place according to a housing type. However, since such an MTC UE does not require a high data rate and has only to satisfy a low data rate with long periodicity, additional installation of a relay or an eNB to improve the poor communication environment of the MTC UE may not be cost-effective. Accordingly, it is preferred to support MTC UEs by utilizing existing networks as much as possible.

The simplest method for overcoming a poor communication environment of an MTC UE is that the MTC UE repeatedly transmits the same data. CSI feedback methods of an MTC UE supporting repeated transmission for a DL physical channel and/or a UL physical channel according to embodiments of the present invention will be described. In addition, the embodiments of the present invention provides methods for multiplexing control information transmitted through uplink and user data information.

4.2 UCI Transmission Methods

Now, a description will be given below of methods for transmitting UCI and/or UL data by an MTC UE. A HARQ-ACK will be taken as an example of UCI. To feed back a decoding result of a PDSCH, a HARQ-ACK is transmitted generally on a PUCCH.

An MTC UE may transmit a PUCCH repeatedly, for reliable transmission. However, since a PDSCH and a PUSCH are typically transmitted independently, it may occur that the MTC UE simultaneously transmits a PUCCH carrying an HARQ-ACK for a received PDSCH and a PUSCH carrying user data.

In the Rel-11 system which is a legacy LTE-A system, if a general UE other than an MTC UE is supposed to transmit a PUCCH and a PUSCH in the same subframe, the general UE piggybacks the PUSCH with control information carried on the PUCCH, prior to transmission.

However, in the case where the coverage of an MTC UE is to be extended, repeated PUCCH transmissions and/or repeated PUSCH transmissions are needed. The repeated transmissions may take place across tens of or hundreds of subframes, thereby lengthening a transmission latency relatively. Moreover, since the MTC UE may be configured not to support spatial multiplexing, a HARQ-ACK may have one information bit at maximum. Therefore, the HARQ-ACK should be iteratively encoded, and thus the performance of the HARQ-ACK information may be increased through combining, irrespective of whether the HARQ-ACK information is transmitted on the PUSCH or the PUCCH.

4.2.1 UCI Transmission Method-1

For the convenience of description, the number of repeated transmissions of a PUCCH carrying an HARQ-ACK information bit is defined as N1, and the number of repeated transmissions of a PUSCH carrying user data is defined as N2 in embodiments of the present invention. Also, the starting point of the repeated PUCCH transmissions is defined as T1, and the starting point of the repeated PUSCH transmissions is defined as T2. It is assumed that in view of the nature of transmitted information, the PUSCH repetition number is larger than the PUCCH repetition number (e.g., N1<N2).

Overlap or non-overlap between repeated PUCCH transmissions and repeated PUSCH transmissions, and the number of overlapped subframes may be determined depending on the relationship between N1, N2, T1, and/or T2, and the following cases may be considered.

(1) Case 1

Repeated PUCCH transmissions are not overlapped with repeated PUSCH transmissions. That is, T1+N1<T2.

(2) Case 2

A repeated PUCCH transmission period is included in a repeated PUSCH transmission period. That is, T2<=T1+N1<T2+N2.

(3) Case 3

The repeated PUCCH transmission period is partially overlapped with the repeated PUSCH transmission period. For example, Case 3 may further be branched into a case in which T1<T2<T1+N1 (Case 3-1) and a case in which T2<T1<T2+N2<T1+N1 (Case 3-2).

In Case 1, there is no problem with operations of the MTC UE because repeated PUCCH transmissions are not overlapped with repeated PUSCH transmissions. On the other hand, in Case 2 and Case 3, if the repeatedly transmitted PUCCH and PUSCH are overlapped with each other, the PUCCH may be transmitted piggybacked to the PUSCH.

4.2.1.1 Transmission Position of HARQ-ACK Information

If a PUSCH is piggybacked with HARQ-ACK information, the HARQ-ACK information may be scheduled to be transmitted in four symbols adjacent to a Reference Signal (RS). The number of REs allocated for transmission of the HARQ-ACK may be determined according to REs corresponding to the four symbols.

For example, if three RBs are allocated for PUSCH transmission of an MTC UE, the number of REs used to transmit HARQ-ACK information is 144 (4 symbols×3 RBs×12 subcarriers=144 REs). To satisfy an error requirement for the HARQ-ACK, additional symbols (e.g., one or two symbols) may be allocated for transmission of the PUSCH piggybacked with the HARQ-ACK information.

4 symbols, 3 RBs, and 12 subcarriers are an embodiment of the present invention. Depending on scheduling and/or a channel environment of an eNB, n symbols, m RBs, and 1 subcarriers (n, m, and 1 are positive numbers) may be used for transmission of HARQ-ACK information.

It is assumed that a repeatedly transmitted PUCCH and a repeatedly transmitted PUSCH are overlapped with each other over S subframes. The MTC UE repeatedly transmits the PUCCH in (N1-S) subframes except for the overlapped subframes, and repeatedly transmits the PUSCH as many times as S by multiplexing user data with the HARQ-ACK information in the S subframes.

4.2.1.2 Transmission Power Determination

Because error requirements may be different for HARQ-ACK information and PUSCH data and the number of REs for PUSCH transmission is decreased due to REs allocated for transmission of the HARQ-ACK information, PUSCH performance may be degraded. Therefore, if a PUCCH is piggybacked to a PUSCH during repeated PUSCH transmissions, the MTC UE may increase PUSCH transmission power. Herein, a power increment ΔP may be set to a fixed value by higher-layer signaling or a DL control channel (e.g., DCI) or may be set in proportion to the number of subframes over which the PUSCH transmissions are overlapped with the PUCCH transmissions.

For PUSCH transmission power, refer to section 5.1.1 of 3GPP TS 36.213 v12.3.0. That is, if an MTC UE piggybacks HARQ-ACK information to a PUSCH, transmission power may be determined to be the sum of existing PUSCH transmission power and the afore-mentioned power increment ΔP in embodiments of the present invention.

FIG. 17 is a diagram illustrating increase/decrease of PUSCH transmission power when a PUSCH is piggybacked with HARQ-ACK information.

FIG. 17(a) illustrates transmission power increase in Case 2, FIG. 17(b) illustrates transmission power increase in Case 3-1, and FIG. 17(c) illustrates transmission power increase in Case 3-2. Reference character P1 denotes the transmission power of a repeatedly transmitted PUCCH, and reference character P2 denotes the transmission power of a repeatedly transmitted PUSCH. ΔP denotes an increment by which the transmission power of the PUSCH is increased, when the PUSCH is piggybacked with the PUCCH. The differences between the heights of squares corresponding to P1, P2, and ΔP simply represent power increase and decrease, not specifying absolute differences between actual transmission power values.

The following [Equation 7] illustrates a power increment, when UCI (e.g., HARQ-ACK information) is piggybacked to the PUSCH.

$$\Delta P = 10 \log 10[(2^{K*R}-1)*\beta_c] \qquad \text{[Equation 7]}$$

In [Equation 7], R represents $N_{ctrl}/N_{RE}$, $\beta_c$ is a constant set by a higher layer, and K is an arbitrary constant. $N_{ctrl}$ represents the number of REs occupied by UCI piggybacked in overlapped subframes, and $N_{RE}$ represents the total number of REs allocated for PUSCH transmission. The total number of REs is the number of REs determined based on RBs allocated by an initial transmission grant, not a retransmission grant, and SRS transmission.

Accordingly, if UCI is piggybacked to the PUSCH, the increased total transmission power may be calculated by the following [Equation 8].

$$P_{SUM} = \min(P\max, P2 + \Delta P) \qquad \text{[Equation 8]}$$

In [Equation 8], $P_{SUM}$ represents transmission power for transmission of the PUSCH piggybacked with the UCI, Pmax represents a maximum transmission power level allocated to the MTC UE, P2 represents transmission power for PUSCH transmission in a subframe, and ΔP represents a power increment calculated by [Equation 7].

4.2.1.3 UL Transmission Methods

Figure 18:
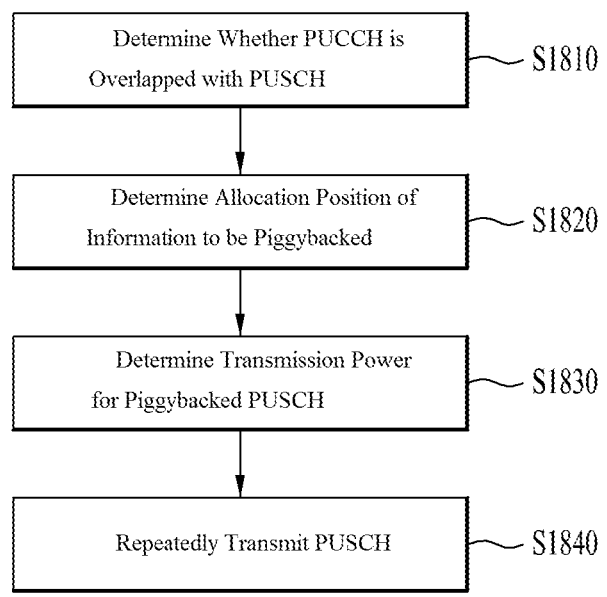
FIG. 18 is a diagram illustrating one of uplink transmission methods in a Machine Type Communication (MTC) User Equipment (UE).

FIG. 18 is a flowchart illustrating one of UL transmission methods in an MTC UE.

The MTC UE may determine whether a PUCCH to be transmitted repeatedly overlaps with a PUSCH to be transmitted repeatedly (e.g., Case 2 or Case 3 described in section 4.2.1) (S1810).

The PUCCH may be transmitted periodically according to the type of UCI to be transmitted, and the PUSCH may be determined according to the amount of UL data that the MTC UE will transmit, and resources allocated to a PUSCH region scheduled by an eNB. Therefore, the MTC UE may determine whether the PUCCH and PUSCH to be transmitted overlap with each other based on the information.

Also, the MTC UE may determine a position at which UCI to be piggybacked will be allocated (S1820).

If the MTC UE determines that the PUCCH overlaps with the PUSCH in step S1810, the MTC UE may determine a piggybacked position of the UCI in the overlapped one or more subframes. For the piggybacked position of the UCI, refer to the description of section 4.2.1.1. In this case, the piggybacked position of the UCI may be predetermined according to the size of the UCI.

The MTC UE may also determine transmission power for the PUSCH piggybacked with the UCI. The piggybacked PUSCH transmission power may be determined based on the description of section 4.2.1.2, and transmission power of the remaining repeatedly transmitted PUSCH or PUCCH may be determined to be transmission power allocated by the eNB or transmission power calculated by the MTC UE (e.g., P2 or P1) (S1830).

Subsequently, the MTC UE may transmit the PUSCH piggybacked with the UCI with the determined transmission power at the determined position (S1840).

It has been described above with reference to FIG. 18 that the MTC UE performs steps S1810, S1820, and S1830. In another aspect of the present invention, however, the eNB may perform all or a part of steps S1810, S1820, and S1830, instead of the MTC UE.

For example, since the eNB schedules a UCI transmission period and a PUSCH transmission region for the MTC UE, the eNB may have knowledge of the information. Accordingly, the eNB may determine whether the PUCCH and the PUSCH overlap with each other, determine an allocation position of UCI to be piggybacked in overlapped subframes, and determine transmission power for the PUSCH in a subframe in which the PUSCH is piggybacked with the UCI. Then, the eNB may support repeated PUSCH transmissions of the MTC UE by transmitting information about the determined resource position and transmission power to the MTC UE.

4.2.2 UCI Transmission Method-2

In another embodiment of the present invention, since a PUCCH carrying HARQ-ACK information is transmitted periodically, the MTC UE may determine whether the PUCCH is to be transmitted before PUSCH transmission. The MTC UE repeatedly transmits a PUSCH piggybacked with the HARQ-ACK information without starting PUCCH transmission. The HARQ-ACK piggybacked to the PUSCH may be transmitted across an entire PUSCH repeated transmission period. Or the HARQ-ACK piggybacked to the PUSCH may be transmitted only in a part of the PUSCH repeated transmission period, for example, by transmitting the HARQ-ACK on the PUCCH as many subframes as a repetition number. This may take place in view of a propagation delay for PUSCH transmission, and the difference between a processing time of the MTC UE for PUSCH transmission and a processing time of the MTC UE for transmitting the HARQ-ACK after PDSCH decoding.

That is, if the repeatedly transmitted PUCCH overlaps with the repeatedly transmitted PUSCH over one or more subframes, the MTC UE may transmit the PUSCH piggybacked with UCI which was supposed to be transmitted on the PUCCH in all or a part of subframes of the repeatedly transmitted PUSCH, without transmitting the PUCCH at all.

4.2.3 UL Transmission Method Using Redundancy Version (RV)

In another embodiment of the present invention, if a repeatedly transmitted PUCCH overlaps with a repeatedly transmitted PUSCH, the MTC UE may be configured not to transmit the PUSCH. In other words, if the PUCCH overlaps with the PUSCH, the MTC UE may repeatedly transmit only the PUCCH, discontinuing the PUSCH transmission. The MTC UE may resume the PUSCH transmission after the repeated PUCCH transmissions. When resuming the repeated PUSCH transmissions, the MTC UE may use RVs.

In embodiments of the present invention, RVs may be used in repeated PUSCH transmissions. That is, when the MTC UE repeatedly transmits the PUSCH, the MTC UE may be configured to use four RVs, RV(0), RV(1), RV(2), and RV(3) cyclically. For example, if the MTC UE starts the repeated PUSCH transmissions with RV(0), the MTC UE may set the RVs cyclically in the order of RV(0), RV(2), RV(3), RV(1), RV(0) RV(2), RV(3), RV(1), . . . in the PUSCH transmissions. If the MTC UE starts the repeated PUSCH transmissions with RV(3), the MTC UE performs RV repeated transmissions cyclically in the order of RV(3), RV(1), RV(0), RV(2), RV(3), RV(1), RV(0), RV(2) . . . .

4.2.3.1 PUSCH Transmission Method Using RV-1

The MTC UE starts repeated PUSCH transmissions using an RV next to the last RV used before repeated PUCCH transmissions. For example, if the RV of the last transmitted PUSCH before repeated PUCCH transmissions is RV(3), the MTC UE starts repeated PUSCH transmissions with RV(1) after completing the repeated PUCCH transmissions.

In Case 3-1, since repeated PUCCH transmissions precede repeated PUSCH transmissions, the repeated PUSCH transmissions are performed using RVs cyclically, starting with an RV indicated by a PDCCH/Enhanced-PDCCH (E-PDCCH).

4.2.3.2 PUSCH Transmission Method Using RV-2

After completing repeated PUCCH transmissions, the MTC UE transmits a PUSCH repeatedly using RVs cyclically, starting with a preset RV (e.g., RV(0)). The preset RV may be indicated to the MTC UE by higher-layer signaling or a DL control channel. For example, after repeated PUCCH transmissions, the MTC UE performs repeated PUSCH transmissions using RVs in the order of RV(0), RV(2), RV(3), RV(1), RV(0), RV(2), RV(3), and RV(1).

When an RV for repeated PUSCH transmissions is signaled to the MTC UE by a PDCCH/E-PDCCH, the MTC UE starts the repeated PUSCH transmissions with the indicated RV. For example, if RV(3) is signaled by a PDCCH/E-PDCCH, the MTC UE may perform repeated PUSCH transmissions using RV(3), RV(1), RV(0), RV(2), RV(3), RV(1), RV(0), RV(2) cyclically in this order after completing repeated PUCCH transmissions.

4.2.3.3 PUSCH Transmission Method Using RV-3

If there are no repeated PUCCH transmissions, the MTC UE starts repeated PUSCH transmissions with an RV to be transmitted. That is, if RV(1) is used before repeated PUCCH transmissions and a PUCCH is transmitted 10 times repeatedly, the MTC UE repeatedly transmits a PUSCH, using RVs cyclically starting with RV(3), assuming that 10 RVs have been used for PUSCH transmissions. Herein, it is assumed that the RVs are cyclic in the order of RV(0), RV(2), RV(3), and RV(1).

Other RV patterns may be applied in the methods described above in section 4.2.3.1 to section 4.3.3.3. For example, if a PUSCH is transmitted repeatedly 20 times, each RV may be transmitted five times, like RV(0) . . . , RV(0), RV(1), . . . , RV(1), RV(2), . . . , RV(2), RV(3), . . . , RV(3). In this case, the above method may be performed on the assumption that there are 20 RVs.

4.2.3.4 Transmission Power Determination when UCI is not Piggybacked

Repeated PUCCH transmissions with UCI not piggybacked to a PUSCH may delay repeated PUSCH transmissions. Then, the MTC UE may perform as many PUSCH transmissions as the delay with increased power. This is done to compensate the transmission power of subframes in which PUSCH transmissions are discontinued, because even though the UCI is not piggybacked to the PUSCH, the PUSCH transmissions are discontinued by the PUCCH transmissions.

In the case where UCI is not piggybacked to a PUSCH, a power increment AP may be calculated by the following [Equation 9].

$$\Delta P = N_c * P / (N - N_c) \qquad \text{[Equation 9]}$$

In [Equation 9], N1 represents a PUSCH repetition number, Nc represents the number of PUSCH subframes which have not been transmitted due to the repeated PUCCH transmissions, P represents PUSCH transmission power, and N*P1 represents total transmission power required for PUSCH reception. $N_c*P1/(N-N_c)$ represents a power increment calculated by dividing transmission power for the non-transmitted PUSCH subframes by the number of the remaining PUSCH subframes.

Accordingly, the total transmission power for the case of non-UCI piggyback may be calculated by [Equation 10].

$$P_{SUM} = \min(P\max, P + \Delta P) \qquad \text{[Equation 10]}$$

In [Equation 10], Pmax represents maximum transmission power of the MTC UE, and P represents transmission power for PUSCH transmission. For the repeated PUSCH transmissions delayed by the repeated PUCCH transmissions, therefore, the MTC UE may transmit the PUSCH with the transmission power calculated by [Equation 10]. As a consequence, the MTC UE may repeatedly transmit the PUSCH delayed by the repeated PUCCH transmissions as many times as the remaining repetition number, with increased transmission power.

Or the transmission time of the PUSCH may be increased by the number of the discontinued PUSCH subframes in another aspect of the present invention. For example, if a PUSCH is supposed to be transmitted in 100 subframes but is not transmitted 20 times due to overlap with PUCCH transmissions, the MTC UE may repeatedly transmit the PUSCH in 20 additional subframes corresponding to the discontinued PUSCH transmissions (i.e., a total PUSCH transmission time is 120 subframes).

4.3 Method for Multiplexing Aperiodic CSI with PUSCH

An aperiodic CSI request is transmitted to the MTC UE on a PDCCH/E-PDCCH. Thus, aperiodic CSI is transmitted multiplexed with user data on a PUSCH. The MTC UE may repeatedly transmit aperiodic CSI on a repeatedly transmitted PUSCH. In embodiments of the present invention described below, it is assumed that a repetition number of aperiodic CSI is N1 and a PUSCH repetition number is N2.

(1) Case 4: N1<N2

Repeated aperiodic CSI transmissions start at the same time point as repeated PUSCH transmissions. For example, the MTC UE may transmit aperiodic CSI multiplexed with user data in N1 subframes starting from the starting time of the repeated PUSCH transmissions, and repeatedly transmit PUSCH data in (N2−N1) subframes.

Or the MTC UE may start the repeated aperiodic CSI transmissions at the ending time of the repeated PUSCH transmissions. That is, upon receipt of an aperiodic CSI request, the MTC UE transmits aperiodic CSI multiplexed with user data in N1 subframes after repeatedly transmitting PUSCH data in (N2−N1) subframes.

(2) Case 5: N1>N2

After the MTC transmits aperiodic CSI multiplexed with user data in N2 subframes on a PUSCH, the MTC UE repeatedly transmits only the aperiodic CSI in (N1 -N2) subframes.

(3) Case 6: N1=N2

When the MTC UE transmits aperiodic CSI, the MTC UE repeatedly transmits the aperiodic CSI according to a PUSCH repetition number.

4.3.1 Transmission Power Control Method

In the above-described Case 4, Case 5, and Case 6, performance degradation may occur because the number of REs allocated for PUSCH transmission is reduced due to aperiodic CSI transmission. Therefore, the MTC UE may transmit the PUSCH with increased power in a subframe in which aperiodic CSI is multiplexed with user data.

4.3.2 Method for Coordinating Contending Aperiodic CSI Requests

The MTC UE does not expect transmission of an aperiodic CSI request during a time period over which aperiodic CSI is repeatedly transmitted. For example, the MTC UE may receive a second aperiodic CSI request during a time period over which aperiodic CSI is repeatedly transmitted. In this case, the MTC UE continues the ongoing aperiodic CSI transmission to the eNB, neglecting the second aperiodic CSI request.

The MTC UE does not expect another PUSCH transmission either during a time period over which it repeatedly transmits aperiodic CSI. That is, if the MTC UE receives control information (e.g., DCI) requesting transmission of a second PUSCH on a PDCCH/E-PDCCH during repeated transmissions of aperiodic CSI, the MTC UE neglects the control information.

In another method, if the MTC UE receives an aperiodic CSI request on a PDCCH/E-PDCCH, the eNB assumes that only aperiodic CSI is transmitted, without expecting transmission of user data on a PUSCH. That is, the PDCCH/E-PDCCH carrying the aperiodic CSI request indicates transmission of only aperiodic CSI to the MTC UE, without scheduling user data of a PUSCH. Herein, transmission of aperiodic CSI only may be scheduled for the MTC UE irrespective of the number of RBs allocated to the MTC UE.

4.3.3 Method for Transmitting PUCCH and Aperiodic CSI

Now, a description will be given of methods for transmitting aperiodic CSI and a PUCCH in the case where aperiodic CSI and a PUCCH carrying a HARQ-ACK are to be transmitted repeatedly in the same subframes. In embodiments of the present invention described below, it is assumed that a repetition number of a PUCCH carrying an HARQ-ACK is N1, a repetition number of aperiodic CSI is N2, the starting time of repeated PUCCH transmissions is T1, and the starting time of repeated aperiodic CSI transmissions is T2.

(1) Method 1

The MTC UE may be configured not to transmit aperiodic CSI in subframes in which the aperiodic CSI overlaps with repeated PUCCH transmissions. In this case, since the aperiodic CSI transmission is discontinued due to the repeated PUCCH transmissions, the MTC UE may increase PUSCH transmission power for transmission of the aperiodic CSI. A related power increment may be preset or set in proportion to the number of subframes in which the aperiodic CSI overlaps with the PUCCH.

(2) Method 2

The MTC UE does not assume transmission of an aperiodic CSI request during repeated PUCCH transmissions. That is, the MTC UE satisfies the relationship that N1+T1<T2. In the presence of an aperiodic CSI request during repeated PUCCH transmissions, the MTC UE may neglect the additional CSI request.

(3) Method 3

The MTC UE does not assume transmission of a PUCCH carrying an HARQ-ACK during repeated aperiodic CSI transmissions. That is, the MTC UE satisfies the relationship that T2+N2<T1. Even in the presence of a subframe carrying a PUCCH according to a PUCCH transmission period during repeated transmissions of aperiodic CSI multiplexed with a PUSCH, the MTC UE may continue the ongoing aperiodic CSI transmission without transmitting the PUCCH.

5. Apparatuses

Apparatuses illustrated in FIG. 19 are means that can implement the methods described before with reference to FIGS. 1 to 18.

A UE may act as a transmission end on a UL and as a reception end on a DL. An eNB may act as a reception end on a UL and as a transmission end on a DL.

That is, each of the UE and the eNB may include a Transmitter (Tx) 1940 or 1950 and a Receiver (Rx) 1960 or 1970, for controlling transmission and reception of information, data, and/or messages, and an antenna 1900 or 1910 for transmitting and receiving information, data, and/or messages.

Each of the UE and the eNB may further include a processor 1920 or 1930 for implementing the afore-described embodiments of the present disclosure and a memory 1980 or 1990 for temporarily or permanently storing operations of the processor 1920 or 1930.

The embodiments of the present invention may be implemented using the above-described components and functions of the UE and the eNB. For example, the processor of the MTC UE and/or the processor of the eNB may support implementation of the methods for repeatedly transmitting a PUCCH and a PUSCH as described in section 4. Also, if a PUCCH and a PUSCH overlap with each other in one or more subframes, various methods for piggybacking the PUSCH with UCI to be transmitted on the PUCCH may be used. For details, the description of section 4 may be referred to, and the contents of sections 1, 2, and 3 may be used as a basis supporting the technology description of section 4.

The Tx and Rx of the UE and the eNB may perform a packet modulation/demodulation function for data transmission, a high-speed packet channel coding function, OFDMA packet scheduling, TDD packet scheduling, and/or channelization. Each of the UE and the eNB of FIG. 19 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1980 or 1990 and executed by the processor 1920 or 1930. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for performing uplink transmission by a Machine Type Communication (MTC) User Equipment (UE) supporting an MTC in a wireless access system, the method performed by the MTC UE and comprising:

receiving a control channel including an uplink grant for scheduling a Physical Uplink Shared Channel (PUSCH); and repeatedly transmitting the PUSCH during a plurality of subframes based on the uplink grant, wherein a redundancy version (RV) value for the PUSCH is cyclically applied as a predetermined number of subframes basis and a same RV value is applied to each of the predetermined number of subframes, wherein the MTC UE is configured to determine whether at least one of the plurality of subframes for transmitting the PUSCH overlaps with at least one of a plurality of subframes for transmitting a Physical Uplink Control Channel (PUCCH), and wherein the PUCCH is to be repeated transmitted on each of the plurality of subframes for transmitting the PUCCH.

2. The method according to claim 1, wherein if the at least one subframe for the PUSCH overlaps with the at least one subframe for the PUCCH, the MTC UE only transmits the PUCCH at the at least one overlapped subframe but the MTC UE does not transmit the PUSCH.

3. The method according to claim 1, wherein if the plurality of subframes for the PUSCH do not overlap with at least one of the plurality of subframes for the PUCCH, the MTC UE repeatedly transmits the PUCCH and the PUSCH.

4. The method according to claim 1, wherein the repeatedly transmitted PUCCHs include a same uplink control information (UCI), and the repeatedly transmitted PUSCHs include a same user data.

5. A method for receiving uplink transmission from a Machine Type Communication (MTC) User Equipment (UE) supporting an MTC in a wireless access system, the method performed by an evolved Node B (eNB) and comprising:

transmitting a control channel including an uplink grant for scheduling a Physical Uplink Shared Channel (PUSCH) to the MTC UE; and repeatedly receiving the PUSCH from the MTC UE during a plurality of subframes based on the uplink grant, wherein a redundancy version (RV) value for the PUSCH is cyclically applied as a predetermined number of subframes basis and a same RV value is applied to each of the predetermined number of subframes, wherein a Physical Uplink Control Channel (PUCCH) is to be repeatedly transmitted on each of a plurality of subframes for transmitting the PUCCH, wherein if the at least one subframe for the PUSCH overlaps with the at least one subframe for the PUCCH, the PUCCH is transmitted at the at least one overlapped subframe but the PUSCH is not transmitted, and wherein if the plurality of subframes for the PUSCH do not overlap with at least one of the plurality of subframes for the PUCCH, the PUCCH and the PUSCH are repeatedly transmitted.

6. The method according to claim 5, wherein the repeatedly transmitted PUCCHs include a same uplink control information (UCI), and the repeatedly transmitted PUSCHs include a same user data.

7. A Machine Type Communication (MTC) User Equipment (UE) supporting an MTC for performing uplink transmission in a wireless access system, the MTC UE comprising:

a receiver;
a transmitter; and
a processor supporting the uplink transmission, wherein the processor is configured to:

receive, by controlling the receiver, a control channel including an uplink grant for scheduling a Physical Uplink Shared Channel (PUSCH), and repeatedly transmit, by controlling the transmitter, the PUSCH during a plurality of subframes based on the uplink grant, wherein a redundancy version (RV) value for the PUSCH is cyclically applied as a predetermined number of subframes basis and a same RV value is applied to each of the predetermined number of subframes, wherein the processor is further configured to determine whether at least one of the plurality of subframes for transmitting the PUSCH overlaps with at least one of a plurality of subframes for transmitting a Physical Uplink Control Channel (PUCCH), and wherein the PUCCH is to be repeatedly transmitted on each of the plurality of subframes for transmitting the PUCCH.

8. The MTC UE according to claim 7, wherein if the at least one subframe for the PUSCH overlaps with the at least one subframe for the PUCCH, the MTC UE only transmits the PUCCH at the at least one overlapped subframe but the MTC UE does not transmit the PUSCH.

9. The MTC UE according to claim 7, wherein if the plurality of subframes for the PUSCH do not overlap with at least one of the plurality of subframes for the PUCCH, the MTC UE repeatedly transmits the PUCCH and the PUSCH.

10. The MTC UE according to claim 7, wherein the repeatedly transmitted PUCCHs include a same uplink control information (UCI), and the repeatedly transmitted PUSCHs include a same user data.

11. An evolved Node B (eNB) for receiving uplink transmission from a Machine Type Communication (MTC) User Equipment (UE) supporting an MTC in a wireless access system, the eNB comprising:

a transmitter;
a receiver; and
a processor for supporting the reception of the uplink transmission, wherein the processor is configured to:

transmit, by controlling the transmitter, a control channel including an uplink grant for scheduling a Physical Uplink Shared Channel (PUSCH), to the MTC UE, and repeatedly receive, by controlling the receiver, the PUSCH during a plurality subframes based on the uplink grant, from the MTC UE, wherein the control channel includes a redundancy version (RV) value for the PUSCH, and wherein a redundancy version (RV) value for the PUSCH is cyclically applied as a predetermined number of subframes basis and a same RV value is applied to each of the predetermined number of subframes, wherein a Physical Uplink Control Channel (PUCCH) is to be repeatedly transmitted on each of a plurality of subframes for transmitting the PUCCH, wherein if the at least one subframe for the PUSCH overlaps with the at least one subframe for the PUCCH, the PUCCH is transmitted at the at least one overlapped subframe but the PUSCH is not transmitted, and wherein if the plurality of subframes for the PUSCH do not overlap with at least one of the plurality of subframes for the PUCCH, the PUCCH and the PUSCH are repeatedly transmitted.

12. The eNB according to claim 11, wherein the repeatedly transmitted PUCCHs include a same uplink control information (UCI), and the repeatedly transmitted PUSCHs include a same user data.

* * * * *